US012639342B2

(12) United States Patent
Pavlovic et al.

(10) Patent No.: US 12,639,342 B2
(45) Date of Patent: May 26, 2026

(54) SYSTEMS AND METHODS FOR DETERMINING DATA-ORIGIN LINKS BETWEEN NAMED ENTITIES

(71) Applicant: Ancestry.com DNA, LLC, Lehi, UT (US)

(72) Inventors: Milos Pavlovic, Sandy, UT (US); Ross Eugene Curtis, Cedar Hills, UT (US); Yong Wang, Foster City, CA (US); Luong Ruiz, San Francisco, CA (US)

(73) Assignee: Ancestry.com DNA, LLC, Lehi, UT (US)

( * ) Notice: Subject to any disclaimer, the term of this patent is extended or adjusted under 35 U.S.C. 154(b) by 0 days.

(21) Appl. No.: 18/924,937

(22) Filed: Oct. 23, 2024

(65) Prior Publication Data

US 2025/0131019 A1      Apr. 24, 2025

Related U.S. Application Data

(60) Provisional application No. 63/592,726, filed on Oct. 24, 2023.

(51) Int. Cl.
G06F 16/00 (2019.01)
G06F 16/28 (2019.01)

(52) U.S. Cl.
CPC .......... G06F 16/288 (2019.01); G06F 16/285 (2019.01)

(58) Field of Classification Search
CPC .... G06F 40/30; G06F 16/2237; G06F 16/248; G06F 16/322; G06F 16/328;
(Continued)

(56) References Cited

U.S. PATENT DOCUMENTS 6,570,567 B1   5/2003   Eaton
7,062,752 B2   6/2006   Simpson et al.
(Continued)

FOREIGN PATENT DOCUMENTS

WO   WO 02/17190 A1   2/2002
WO   WO 2012/099890 A1   7/2012
(Continued)

OTHER PUBLICATIONS

Allende, C. et al. "Treelink: Data Integration, Clustering and Visualization of Phylogenetic Trees." BMC Bioinformatics, vol. 16, Dec. 2015, pp. 3-6.
(Continued)

*Primary Examiner* — Shyue Jiunn Hwa
(74) *Attorney, Agent, or Firm* — Fenwick & West LLP

(57) ABSTRACT

A system includes a computing device having one or more processors and memory configured to store instructions, wherein the instructions, when executed by the one or more processors, cause the one or more processors to perform steps including receiving a first named entity dataset associated with a first named entity, receiving a second named entity dataset associated with a second named entity who is a potential named entity linked to the first named entity, identifying a plurality of data matches, each data match being a named entity whose data segments match the first named entity dataset, the second named entity dataset, or both, extracting features from the plurality of data matches, and inputting the extracted features into a machine learning model to determine a data-origin link between the first named entity and the second named entity.

20 Claims, 8 Drawing Sheets

(58) Field of Classification Search

CPC .. G06F 16/3344; G06F 16/345; G06F 16/367; G06F 40/20; G06F 40/289; G06F 40/40; G06F 9/451; G06F 9/453; G06F 9/547; G06F 16/93; G06F 40/12; G06F 40/205; G06F 40/216; G06F 40/295; G06F 3/167; G06F 40/284; G06F 40/35; G06F 40/211; G06F 18/22; G06F 40/242; G06F 16/26; G06N 20/00; G06N 3/04; G06N 3/044; G06N 3/045; G06N 5/022; G06N 3/0455; G06N 3/0464; G06N 3/08; G06N 3/096; G06N 7/01; G06N 5/04; G06N 3/09

See application file for complete search history.

(56) References Cited

U.S. PATENT DOCUMENTS

| | | | |
|---|---|---|---|
| 7,249,129 B2 | 7/2007 | Cookson et al. | |
| 7,818,281 B2 | 10/2010 | Kennedy et al. | |
| 8,510,057 B1 | 8/2013 | Avey et al. | |
| 8,769,438 B2 | 7/2014 | Mangum et al. | |
| 9,116,882 B1 | 8/2015 | Macpherson et al. | |
| 9,213,944 B1 | 12/2015 | Do et al. | |
| 9,213,947 B1 | 12/2015 | Do et al. | |
| 9,336,177 B2 | 5/2016 | Hawthorne et al. | |
| 9,367,800 B1 | 6/2016 | Do et al. | |
| 9,836,576 B1 | 12/2017 | Do et al. | |
| 9,864,835 B2 | 1/2018 | Avey et al. | |
| 9,977,708 B1 | 5/2018 | Do et al. | |
| 10,114,922 B2 | 10/2018 | Byrnes et al. | |
| 10,223,498 B2 | 3/2019 | Han et al. | |
| 10,347,365 B2 | 7/2019 | Wong et al. | |
| 10,354,745 B2 | 7/2019 | Wong et al. | |
| 10,558,930 B2 | 2/2020 | Noto et al. | |
| 10,679,729 B2 | 6/2020 | Ball et al. | |
| 12,050,629 B1 | 7/2024 | Noto | |
| 2002/0019746 A1 | 2/2002 | Rienhoff et al. | |
| 2002/0143578 A1 | 10/2002 | Cole et al. | |
| 2003/0059808 A1 | 3/2003 | Liu et al. | |
| 2003/0101000 A1 | 5/2003 | Bader et al. | |
| 2003/0113727 A1 | 6/2003 | Girn et al. | |
| 2003/0172065 A1 | 9/2003 | Sorenson et al. | |
| 2004/0083226 A1 | 4/2004 | Eaton | |
| 2004/0093334 A1 | 5/2004 | Scherer | |
| 2004/0126840 A1 | 7/2004 | Cheng et al. | |
| 2005/0089852 A1 | 4/2005 | Lee et al. | |
| 2005/0147947 A1 | 7/2005 | Cookson et al. | |
| 2005/0164704 A1 | 7/2005 | Winsor | |
| 2005/0164705 A1 | 7/2005 | Rajkotia et al. | |
| 2005/0192008 A1 | 9/2005 | Desai et al. | |
| 2007/0050354 A1 | 3/2007 | Rosenberg | |
| 2007/0260599 A1 | 11/2007 | McGuire et al. | |
| 2008/0027656 A1 | 1/2008 | Parida | |
| 2008/0040046 A1 | 2/2008 | Chakraborty et al. | |
| 2008/0081331 A1 | 4/2008 | Myres et al. | |
| 2008/0082955 A1 | 4/2008 | Andreessen et al. | |
| 2008/0113727 A1 | 5/2008 | Vallejo et al. | |
| 2008/0154566 A1 | 6/2008 | Myres et al. | |
| 2008/0162510 A1 | 7/2008 | Baio et al. | |
| 2008/0255768 A1 | 10/2008 | Martin et al. | |
| 2009/0030985 A1 | 1/2009 | Yuan | |
| 2011/0038512 A1* | 2/2011 | Petrou | G06F 16/532 |
| | | | 382/118 |
| 2012/0054190 A1 | 3/2012 | Peters | |
| 2012/0191903 A1 | 7/2012 | Araki et al. | |
| 2012/0283108 A1 | 11/2012 | Sampas | |
| 2013/0085728 A1 | 4/2013 | Tang et al. | |
| 2013/0149707 A1 | 6/2013 | Sorenson et al. | |
| 2013/0297221 A1 | 11/2013 | Johnson et al. | |
| 2014/0045705 A1 | 2/2014 | Bustamante et al. | |
| 2014/0067355 A1 | 3/2014 | Noto et al. | |
| 2014/0082568 A1 | 3/2014 | Hulet et al. | |
| 2014/0108527 A1 | 4/2014 | Aravanis et al. | |
| 2014/0278138 A1 | 9/2014 | Barber et al. | |
| 2015/0019912 A1* | 1/2015 | Darling | G06F 11/3684 |
| | | | 714/26 |

| | | | |
|---|---|---|---|
| 2016/0026755 A1 | 1/2016 | Byrnes et al. | |
| 2017/0213127 A1 | 7/2017 | Duncan | |
| 2017/0220738 A1 | 8/2017 | Barber et al. | |
| 2017/0262577 A1 | 9/2017 | Ball et al. | |
| 2017/0277827 A1 | 9/2017 | Granka et al. | |
| 2019/0139623 A1 | 5/2019 | Bryc et al. | |
| 2021/0034647 A1 | 2/2021 | Nguyen et al. | |
| 2022/0300711 A1* | 9/2022 | Elisco | G06F 16/93 |
| 2023/0019141 A1 | 1/2023 | Garrigan et al. | |
| 2024/0411781 A1 | 12/2024 | Noto | |

FOREIGN PATENT DOCUMENTS

| | | |
|---|---|---|
| WO | WO 2014/145280 A1 | 9/2014 |
| WO | WO 2016/061260 A1 | 4/2016 |
| WO | WO 2016/061568 A1 | 4/2016 |

OTHER PUBLICATIONS

Bettinger, B., "Clustering Shared Matches," The Genetic Genealogist, Jan. 3, 2017, 16 pages, [online] [Retrieved on Sep. 2, 2020] Retrieved from the Internet <URL: https://thegeneticgenealogist.com/2017/01/03/clustering-shared-matches/>.

Browning, B. L. et al. "Fast Two-Stage Phasing of Large-Scale Sequence Data." The American Journal of Human Genetics, vol. 108, Oct. 7, 2021, pp. 1880-1890.

Browning, B. L. et al., "Improving the Accuracy and Efficiency of Identity by Descent Detection in Population Data," Genetics, Jun. 2013, pp. 459-471, vol. 194.

Browning, B. L. et al., "A Unified Approach to Genotype Imputation and Haplotype Phase Inference for Large Data sets of Trios and Unrelated Individuals," The American Journal of Human Genetics, Feb. 13, 2009, pp. 210-223, vol. 84.

Browning, B.L et al., "Efficient Multilocus Association Testing for Whole Genome Association Studies Using Localized Haplotype Clustering," Genetic Epidemiology, vol. 31, Feb. 26, 2007, pp. 365-375.

Browning, B.L. et al., "A Fast, Powerful Method for Detecting Identity by Descent," The American Journal of Human Genetics, Feb. 11, 2011, vol. 88, No. 2, pp. 173-182.

Browning, S.R. et al., "Haplotype Phasing: Existing Models and New Developments," Nature Reviews Genetics, Oct. 2011, pp. 703-714, vol. 12.

Browning, S.R. et al., "Rapid and Accurate Haplotype Phasing and Missing-Data Inference for Whole-Genome Association Studies by Use of Localized Haplotype Clustering," American Journal of Human Genetics, vol. 81, Nov. 2007, pp. 1084-1096.

Browning, S.R., "Multilocus Association Mapping Using Variable-Length Markov Chains," American Journal of Human Genetics, Apr. 7, 2006, pp. 903-913, vol. 78, No. 6.

Cooper, K., "More Automated DNA Match Clustering!," Kitty Cooper's Blog, Dec. 30, 2018, 13 pages, [Online] [Retrieved on Nov. 16, 2023] Retrieved from the Internet <URL:https://blog.kittycooper.com/2018/12/more-automated-dna-match-clustering/>.

Delaneau, O. et al. Accurate, Scalable and Integrative Haplotype Estimation, Nature Communications, vol. 10, No. 1, Nov. 28, 2019, pp. 1-10.

Delaneau, O. et al. "Integrating Sequence and Array Data to Create an Improved 1000 Genomes Project Haplotype Reference Panel." Nature Communications, vol. 5, Jun. 13, 2014, pp. 1-9.

DNA Painter, "Convert Autocluster Table to Spreadsheet Format," Dec. 5, 2018, one pages, [Online] [Retrieved on Sep. 2, 2020] Retrieved from the Internet <URL:https://dnapainter.com/tools/convertac>.

Druet, T., et al., "A Hidden Markov Model Combining Linkage and Linkage Disequilibrium Information for Haplotype Reconstruction and Quantitative Trait Locus Fine Mapping," Genetics, Mar. 2010, pp. 789-798, vol. 184, No. 3.

Dudoit, S. et al., "A score test for the linkage analysis of qualitative and quantitative traits based on identity by descent data from sib-pairs," Biostatistics, vol. 1, Iss. 1, Mar. 2000, pp. 1-26.

(56) References Cited

OTHER PUBLICATIONS

Durand, E.Y. et al., "Reducing Pervasive False-Positive Identical-by-Descent Segments Detected by Large-Scale Pedigree Analysis," Molecular Biology and Evolution, Apr. 30, 2014, pp. 2212-2222, vol. 31, No. 8.

Durbin, R. M. et al., "A Map of Human Genome Variation from Population-Scale Sequencing," Nature, Oct. 28, 2010, pp. 1061-1073, vol. 467.

Elston, R.C. et al., "A General Model for the Genetic Analysis of Pedigree Data," Human Heredity, 1971, pp. 523-542, vol. 21, No. 6.

European Patent Office, Extended European Search Report, European Patent Application No. 24175027.2, Jun. 27, 2024, six pages.

Falush, D. et al., "Inference of Population Structure Using Multilocus Genotype Data: Linked Loci and Correlated Allele Frequencies," Genetics, vol. 164, Aug. 2003, pp. 1567-1587.

Genetic Affairs, "AutoCluster for Marcos Bradford—DNA account: Weimer Berkeley," Genetic Affairs, Nov. 30, 2018, 4 pages, [Online] [Retrieved on Nov. 16, 2023] Retrieved from the Internet <URL:http://geneticaffairs.com/auto_cluster/examples/autocluster_2nd_3rd.html>.

Griffiths, B., "Shared matches—matches who match both my paternal and maternal lines," Not Just the PARRYs, Aug. 9, 2017, 5 pages, [Online] [Retrieved on Nov. 16, 2023] Retrieved from the Internet <URL:http://notjusttheparrys.blogspot.com/2017/08/shared-matches-matches-who-match-both.html>.

Gusev, A. et al., "Whole Population, Genome-wide Mapping of Hidden Relatedness," Genome Research, 2009, pp. 318-326, vol. 19.

Henn, B. M. et al. "Cryptic Distant Relatives are Common in Both Isolated and Cosmopolitan Genetic Samples." PLoS One, vol. 7, No. 4, Apr. 2012, pp. 1-13.

Jarvis, J.P. et al., "Patterns of Ancestry of Natural Selection and Genetic Association with Stature in Western African Pygmies," PLoS Genetics, vol. 8, Iss. 4, Apr. 26, 2012, pp. 1-15.

Kenny, E.E. et al., "Increased Power of Mixed Models Facilitates Association Mapping of 10 Loci for Metabolic Traits in an Isolated Population," Human Molecular Genetics, Feb. 15, 2011, pp. 827-839, vol. 20, No. 4.

Kong, A. et al. "Detection of Sharing by Descent, Long-Range Phasing and Haplotype Imputation," Nature Genetics, Author Manuscript, Sep. 2008, vol. 40, No. 9, pp. 1-22.

Lander, E.S. et al., "Construction of Multilocus Genetic Linkage Maps in Humans," Proc. Nat. Acad. Sci., Apr. 1987, pp. 2363-2367, vol. 84.

Li, H. et al., "Relationship Estimation from Whole-Genome Sequence Data," PLOS Genetics, Jan. 30, 2014, e1004144, pp. 1-12, vol. 10, No. 1.

Li, Y. et al., "Haplotype Reconstruction in Large Pedigrees with Untyped Individuals through IBD reference," Journal of Computational Biology, Nov. 2011, vol. 18, No. 11, pp. 1411-1421.

Li, Y. et al., "MaCH: Using Sequence and Genotype Data to Estimate Haplotypes and Unobserved Genotype," Genetic Epidemiology, Nov. 5, 2010, pp. 816-834, vol. 34, No. 8.

Livne, O.E. et al., "PRIMAL: Fast and Accurate Pedigree-based Imputation from sequence data in a Founder Population," PLOS Computational Biology, Mar. 3, 2015, vol. 11, No. 3, pp. 1-14.

Loh, P-R. et al. "Reference-Based Phasing Using the Haplotype Reference Consortium Panel." Nature Genetics, Author Manuscript, vol. 48, No. 11, Nov. 2016, pp. 1-20.

Meuwissen, T. et al., "The Use of Family Relationships and Linkage Disequilibrium to Impute Phase and Missing Genotypes in Up to Whole Genome Sequence Density Genotypic Data," Genetics, Aug. 2010, pp. 1441-1449, vol. 185.

Morrison, A.C. et al., "Prediction of Coronary Heart Disease Risk using a Genetic Risk Score: The Atherosclerosis Risk in Communities Study," American Journal of Epidemiology, vol. 166, No. 1, Apr. 18, 2007, pp. 28-35.

Naseri, A. et al. "RaPID: Ultra-Fast, Powerful, and Accurate Detection of Segments Identical by Descent (IBD) in Biobank-Scale Cohorts." Genome Biology, vol. 20, Jul. 25, 2019, pp. 1-15.

Noto, K. et al. "Accurate Genome-Wide Phasing from IBD Data." BMC Bioinformatics, vol. 23, Nov. 23, 2022, pp. 1-16.

Ott, J., "Estimation of the Recombination Fraction in Human Pedigrees: Efficient Computation of the Likelihood for Human Linkage Studies," American Journal of Human Genetics, 1974, pp. 588-597, vol. 26, No. 5.

Palin, K. et al., "Identity-by-Descent-Based Phasing and Imputation in Founder Populations Using Graphical Models," Genetic Epidemiology, vol. 35, Oct. 17, 2011, pp. 853-860.

PCT International Search Report and Written Opinion, PCT Application No. PCT/US2024/042974, Dec. 6, 2024, 16 pages.

Pedregosa, F. et al. "Scikit-learn: Machine Learning in Python." Journal of Machine Learning Research, vol. 12, Oct. 2011, pp. 2825-2830.

Platt, J.C., "Probabilistic Outputs for Support Vector Machines and Comparisons to Regularized Likelihood Methods," Mar. 26, 1999, pp. 1-11.

Price, A.L. et al., "Sensitive Detection of Chromosomal Segments of Distinct Ancestry in Admixed Populations," PLoS Genetics, vol. 5, Iss. 6, Jun. 2009, pp. 1-18.

Purcell, S. et al., "PLINK: A tool set for whole-genome association and population-based linkage analyses," The American Journal of Human Genetics, vol. 81, Sep. 2007, pp. 559-575.

Qian, Y. et al., "Efficient clustering of identity-by-descent between multiple individuals," Bioinformatics, vol. 30, No. 7, Dec. 19, 2013, pp. 915-922.

Rabiner, L.R., "A Tutorial on Hidden Markov Models and Selected Applications in Speech Recognition," Proceedings of the IEEE, vol. 77, No. 2, Feb. 1989, pp. 257-286.

Ramstetter, M. D. et al., "Inferring Identical-by-Descent Sharing of Sample Ancestors Promotes High-Resolution Relative Detection," The American Journal of Human Genetics, vol. 103, Jul. 5, 2018, pp. 30-44.

Rocchi, M., et al., "Ancestral genomes reconstruction: An integrated, multi-disciplinary approach is needed," Genome Research, Oct. 2006, pp. 1441-1444, vol. 16, No. 12.

Ron, D. et al., "On the Learnability and Usage of Acyclic Probabilistic Finite Automata," Journal of Computer and System Sciences, vol. 56, 1998, pp. 133-152.

Scheet, P. et al., "A Fast and Flexible Statistical Model for Large-Scale Population Genotype Data: Applications to Inferring Missing Genotypes and Haplotypic Phase," The American Journal of Human Genetics, vol. 78, Feb. 17, 2006, pp. 629-644.

Seligsohn, U. et al., "Genetic Susceptibility to Venous Thrombosis," The New England Journal of Medicine, vol. 344, No. 16, Apr. 19, 2001, pp. 1222-1231.

Speed, D. et al., "Relatedness in the post-genomic era: is it still useful?" Nature Reviews Genetics, Jan. 2015, vol. 16, No. 1, pp. 33-45.

Staples, J. et al., "PRIMUS: Rapid Reconstruction of Pedigrees from Genome-wide Estimates of Identity by Descent," The American Journal of Human Genetics, vol. 95, Nov. 6, 2014, pp. 553-564.

Sticca, E. L. et al. "Current Developments in Detection of Identity-by-Descent Methods and Applications." Frontiers in Genetics, vol. 12, Sep. 2021, pp. 1-6.

Sundquist, A. et al., "Effect of Genetic Divergence in Identifying Ancestral Origin using HAPAA," Genome Res., vol. 18, Mar. 18, 2008, pp. 676-682.

Tewhey, R. et al. "The Importance of Phase Information for Human Genomics." Nature Reviews Genetics, vol. 12, Mar. 2011, pp. 215-223.

The International Hapmap 3 Consortium, "Integrating common and rare genetic variation in diverse human populations," Nature, vol. 467, Sep. 2, 2010, pp. 52-58.

Thompson, E. A. "Statistical Inference from Genetic Data on Pedigrees," NSF-CBMS Regional Conference Series in Probability and Statistics, 2000, 186 pages, vol. 6.

Thompson, E.A., "Identity by Descent: Variation in Meiosis, Across Genomes, and in Populations," Genetics, Jun. 2013, pp. 301-326, vol. 194.

Tipping, M.E., "Sparse Bayesian Learning and the Relevance Vector Machine," Journal of Machine Learning Research, Jun. 2001, pp. 211-244.

(56) References Cited

OTHER PUBLICATIONS

Visscher, P.M et al., "Heritability in the genomics era-concepts and misconceptions," Nature Reviews Genetics, Mar. 4, 2008, pp. 255-266.

Weedon, M.N. et al., "Combining Information from Common Type 2 Diabetes Risk Polymorphisms Improves Disease Prediction," PLoS Med., vol. 3, Iss. 10, Oct. 2006, pp. 1877-1882.

Welch, B. L., "The Generalization of "Student's" Problem When Several Different Population Variances are Involved," Biometrika, Jan. 1947, pp. 28-35, vol. 34, Issue 1-2.

Williams, A.L. et al., "Phasing of Many Thousands of Genotyped Samples," American Journal of Human Genetics, Aug. 10, 2012, pp. 238-251, vol. 91, No. 2.

Yang, Q. et al., "Improving the Prediction of Complex Diseases by Testing for Multiple Disease-Susceptibility Genes," American Journal of Human Genetics, vol. 72, Feb. 14, 2003, pp. 636-649.

Yoon, B-J., "Hidden Markov Models and their Applications in Biological Sequence Analysis," Current Genomics, vol. 10, Sep. 2009, pp. 402-415.

youtube.com, "Merry DNA Christmas—Family History Fanatics Live," Family History Fanatics, Dec. 14, 2018, one page, [Online] [Retrieved on Nov. 16, 2023] Retrieved from the Internet <URL: https://www.youtube.com/watch?v =--eruCeJ9_8>.

* cited by examiner

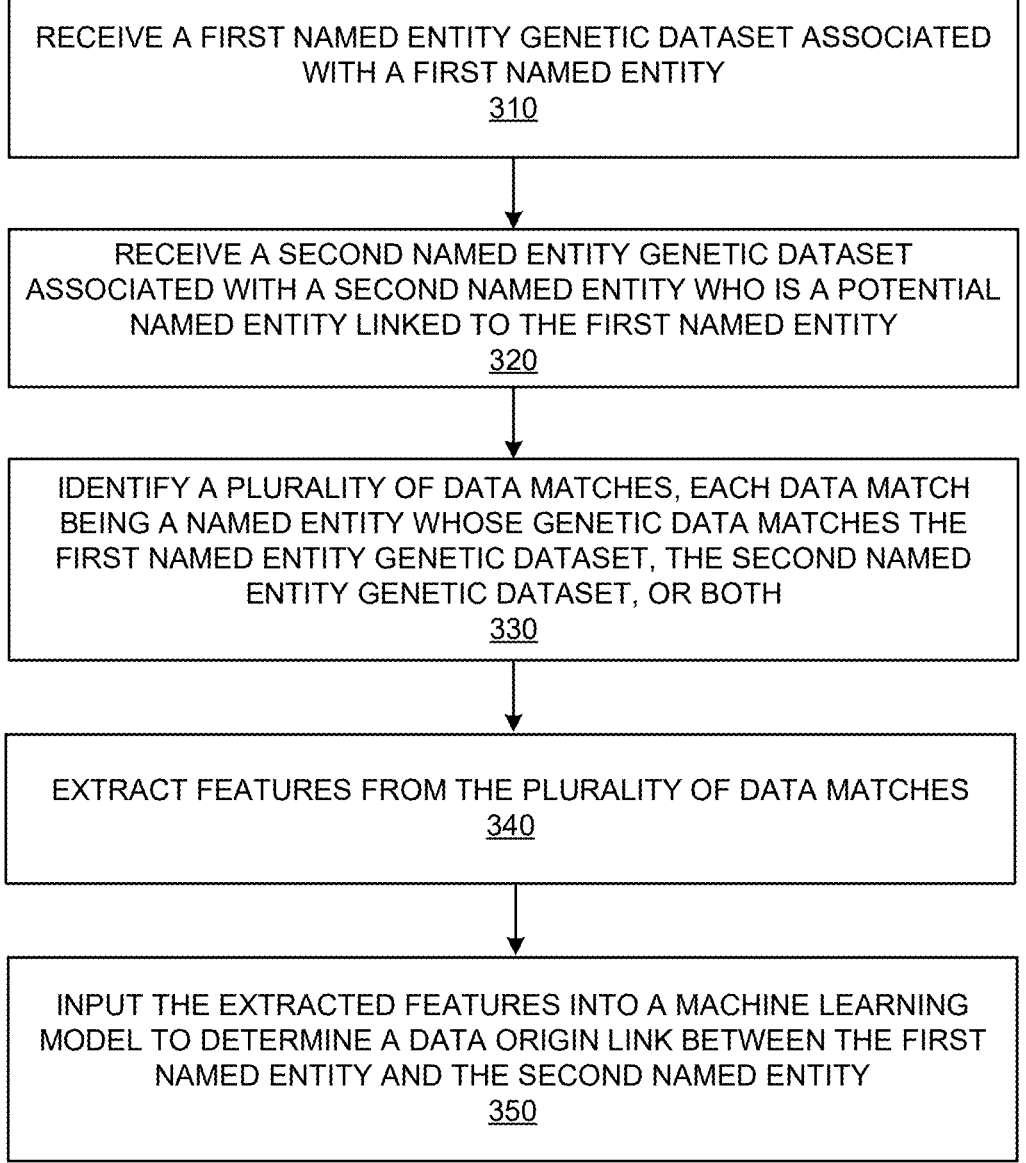

RECEIVE A FIRST NAMED ENTITY GENETIC DATASET ASSOCIATED
WITH A FIRST NAMED ENTITY
310

RECEIVE A SECOND NAMED ENTITY GENETIC DATASET
ASSOCIATED WITH A SECOND NAMED ENTITY WHO IS A POTENTIAL
NAMED ENTITY LINKED TO THE FIRST NAMED ENTITY
320

IDENTIFY A PLURALITY OF DATA MATCHES, EACH DATA MATCH
BEING A NAMED ENTITY WHOSE GENETIC DATA MATCHES THE
FIRST NAMED ENTITY GENETIC DATASET, THE SECOND NAMED
ENTITY GENETIC DATASET, OR BOTH
330

EXTRACT FEATURES FROM THE PLURALITY OF DATA MATCHES
340

INPUT THE EXTRACTED FEATURES INTO A MACHINE LEARNING
MODEL TO DETERMINE A DATA ORIGIN LINK BETWEEN THE FIRST
NAMED ENTITY AND THE SECOND NAMED ENTITY
350

SYSTEMS AND METHODS FOR DETERMINING DATA-ORIGIN LINKS BETWEEN NAMED ENTITIES

CROSS-REFERENCE TO RELATED APPLICATION

The present application claims the benefit of U.S. Provisional Patent Application No. 63/592,726, filed on Oct. 24, 2023, which is hereby incorporated by reference in its entirety.

FIELD

The disclosed embodiments relate to determining data-origin links between two named entities based on links with other named entities.

BACKGROUND

Determining a data-origin link between two designated named entities based on user input data and inheritance information can be difficult due to various factors, such as inaccuracies in user-submitted data and computational challenges associated with large-scale databases. Origin data provided by users may contain inaccuracies or incomplete information. This may be due to factors like human error, miscommunication, or gaps in knowledge about entities. These inaccuracies in the input data make it challenging to construct an accurate and comprehensive data tree based on the user provided information alone.

Large-scale databases, which may consist of billions of data records, add further difficulties in identifying data-origin links between two designated named entities. Comparing vast datasets without a clear strategy can be computationally infeasible due to the significant amount of data involved. Such a process may not only be time-consuming but also computationally inefficient, consuming unnecessary network bandwidth and resulting in repeated comparison of massive amounts of database data. Additionally, matching non-perfect data segments and running algorithms that can swiftly identify data matches in large datasets pose challenges in terms of accuracy, speed, scalability, and memory usage.

Developing efficient algorithms and leveraging technological advancements can help overcome some of these hurdles and improve the accuracy of database research such as determining a data-origin link between two designated named entities.

SUMMARY

The system disclosed herein relates to example embodiments a system that includes a computing device having one or more processors and memory configured to store instructions, wherein the instructions, when executed by the one or more processors, cause the one or more processors to perform steps including receiving a first named entity dataset associated with a first named entity, receiving a second named entity dataset associated with a second named entity who is a potential named entity linked to the first named entity, identifying a plurality of data matches, each data match being a named entity whose data segments match the first named entity dataset, the second named entity dataset, or both, extracting features from the plurality of data matches, and inputting the extracted features into a machine learning model to determine a data-origin link between the first named entity and the second named entity.

In yet another embodiment, a non-transitory computer readable medium that is configured to store instructions is described. The instructions, when executed by one or more processors, cause the one or more processors to perform a process that includes steps described in any embodiments of this disclosure. In yet another embodiment, a system may include one or more processors and a storage medium that is configured to store instructions. The instructions, when executed by one or more processors, cause the one or more processors to perform a process that includes steps described in any embodiments of this disclosure.

BRIEF DESCRIPTION OF THE DRAWINGS

FIG. 3 is a flowchart depicting a process that determines familial relationships between a target individual and a target relative, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similarity or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
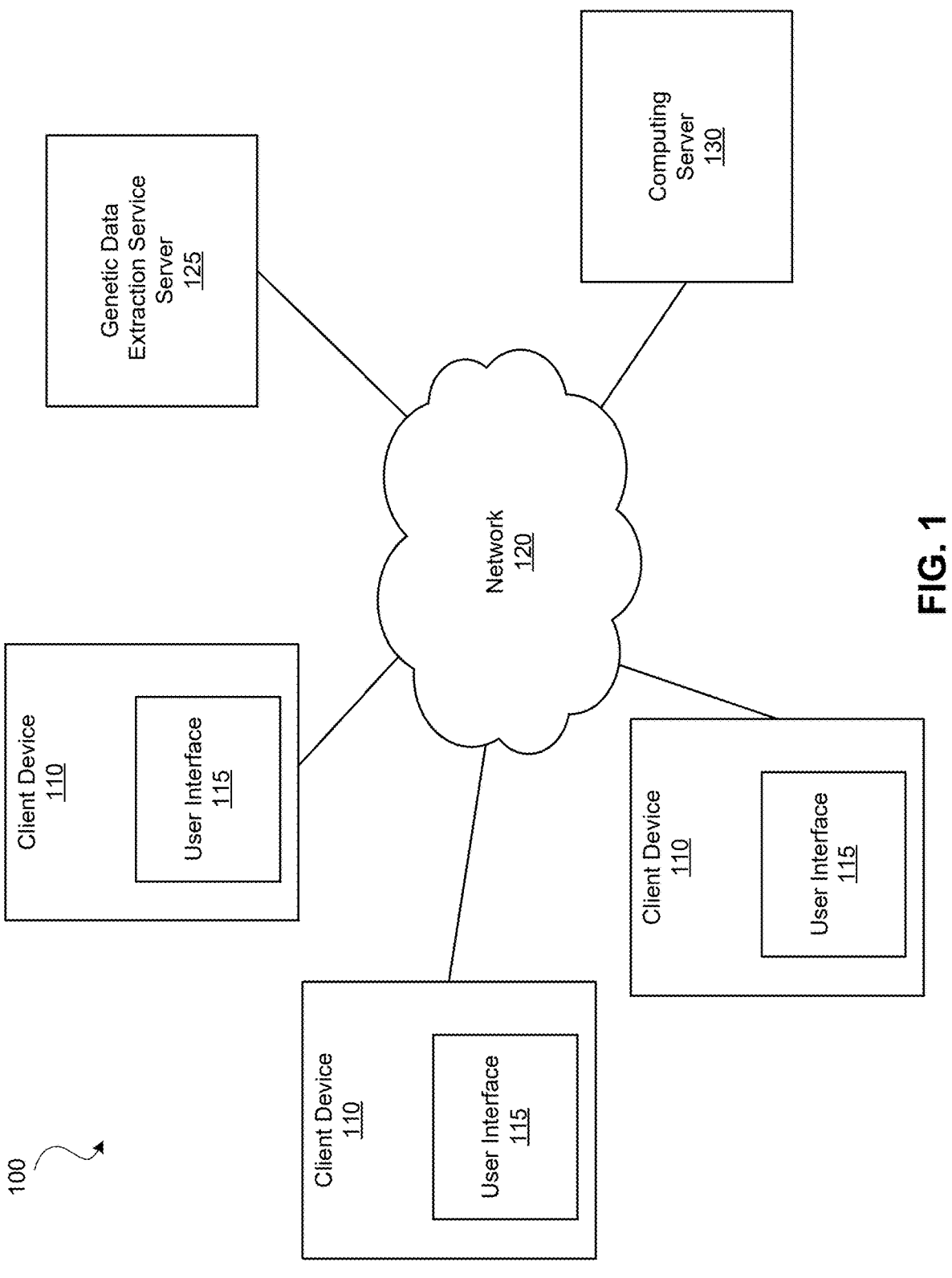
FIG. 1 illustrates a diagram of a system environment of an example computing system, in accordance with an embodiment.

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more subnetworks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet-switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as microarray genotyping, amplification and/or sequencing. Microarray genotyping may include immobilizing probe DNA sequences, onto a solid surface such as a glass slide. Target DNA samples, labeled with fluorescent tags, are then applied to the microarray surface. Through complementary base pairing, the labeled DNA binds to its corresponding probe on the microarray. By detecting the fluorescence emitted by the labeled DNA, genetic data may be extracted. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 extracts genetic data from the samples and the data may take the form of a set of SNPs. The genetic data extraction service server 125 generates the genetic data of the individuals based on sequencing or microarray genotyping results. The genetic data may include data generated from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from DNA identification results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the inheritance dataset of an individual. SNPs, base pair sequences, genotypes, haplotypes, RNA sequences, protein sequences, and phenotypes are examples of biomarkers. In some embodiments, each SNP site may have two readings that are heterozygous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed on the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to the user's privacy setting and authorization, the computing server 130 may allow information generated from the user's inheritance dataset to be linked to the user profile and to one or more of the family trees. The users may also authorize the computing server 130 to analyze their inheritance dataset and allow their profiles to be discovered by other users.

Example Computing Server Architecture

Figure 2:
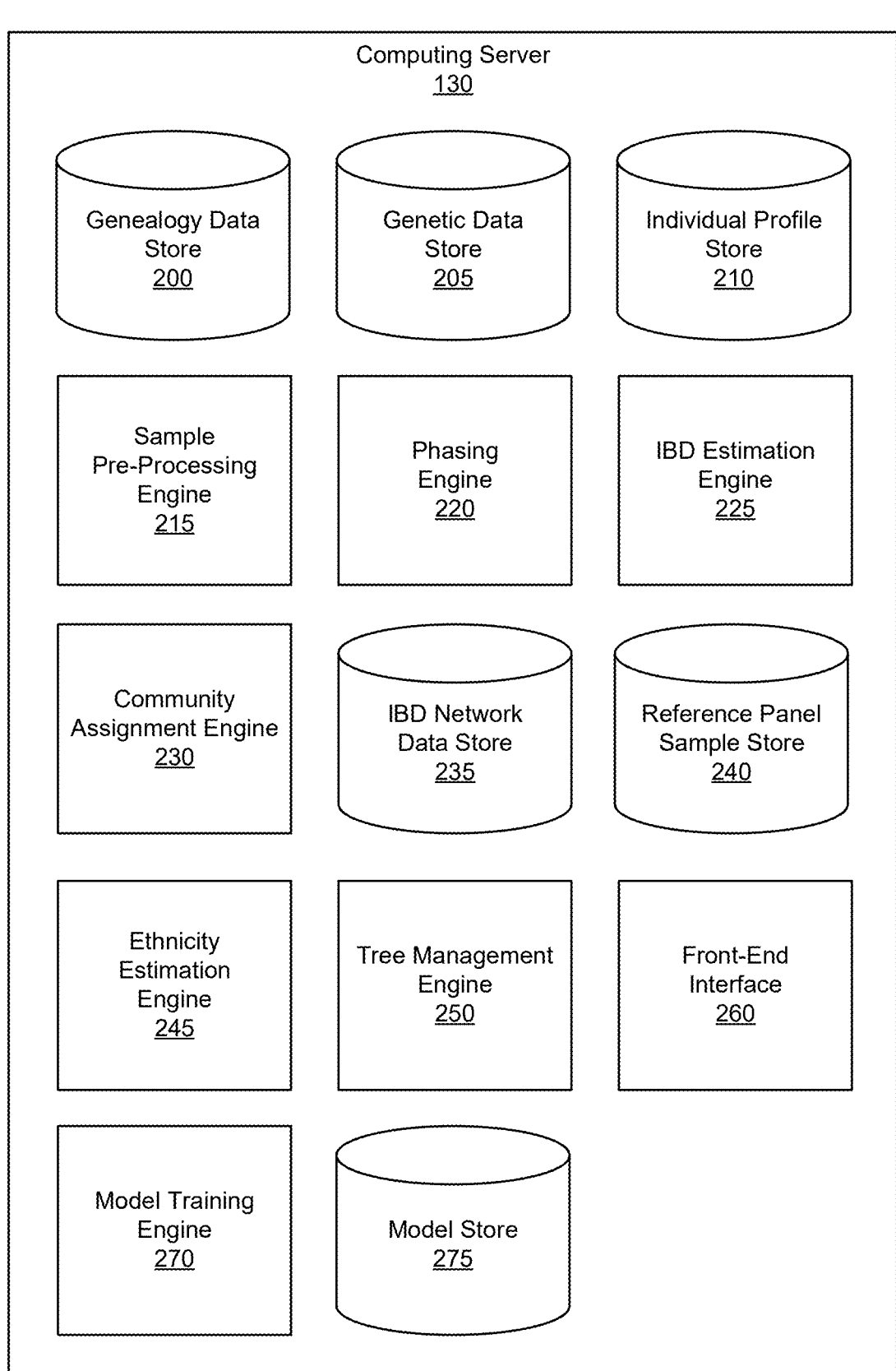
FIG. 2 is a block diagram of an architecture of an example computing system, in accordance with an embodiment.

FIG. 2 is a block diagram of the architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 260, and a tree management engine 250. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections between a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains inheritance datasets of individuals in the genetic data store 205. An inheritance dataset of an individual may be a digital dataset of nucleotide data (e.g., SNP data) and corresponding metadata. For example, an inheritance dataset may be genetic data extracted by the genetic data extraction service server 125. An inheritance dataset may contain data on the whole or portions of an individual's genome. The genetic data store 205 may store a pointer to a location associated with the genealogy data store 200 associated with the individual. An inheritance dataset may take different forms. In some embodiments, an inheritance dataset may take the form of a base pair sequence of the sequencing result of an individual. A base pair sequence dataset may include the whole genome of the individual (e.g., obtained from a whole-genome sequencing) or some parts of the genome (e.g., genetic loci of interest). A microarray datum may take the form of SNP data at target positions in the genome.

In another embodiment, an inheritance dataset may take the form of sequences of genetic markers. Examples of genetic markers may include target SNP sites (e.g., allele sites) filtered from the DNA identification results. A SNP site that is a single base pair long may also be referred to as a SNP locus. A SNP site may be associated with a unique identifier. The inheritance dataset may be in the form of diploid data that includes a sequence of genotypes, such as genotypes at the target SNP site, or the whole base pair sequence that includes genotypes at known SNP sites and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile.

For example, the unique individual identifier and the metadata may be stored as a key-value pair using the unique individual identifier as a key.

An individual's profile data may include various kinds of information related to the individual. The metadata about the individual may include one or more pointers associating inheritance datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to the environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., target relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide heightened privacy as a default setting for certain types of data, such as genetic data or any data that the user marks as sensitive. The user may opt in to sharing those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

In some embodiments, the individual profile store 210 may be a large-scale data store. In some embodiments, the individual profile store 210 may include at least 10,000 data records in the form of user profiles and each user profile may be associated with one or more inheritance datasets and one or more genealogical data entries. In some embodiments, the individual profile store 210 may include at least 50,000 data records in the form of user profiles and each user profile may be associated with one or more inheritance datasets and one or more genealogical data entries. In some embodiments, the individual profile store 210 may include at least 100,000 data records in the form of user profiles and each user profile may be associated with one or more inheritance datasets and one or more genealogical data entries. In some embodiments, the individual profile store 210 may include at least 500,000 data records in the form of user profiles and each user profile may be associated with one or more inheritance datasets and one or more genealogical data entries. In some embodiments, the individual profile store 210 may include at least 1,000,000 data records in the form of user profiles and each user profile may be associated with one or more inheritance datasets and one or more genealogical data entries. In some embodiments, the individual profile store 210 may include at least 2,000,000 data records in the form of user profiles and each user profile may be associated with one or more inheritance datasets and one or more genealogical data entries. In some embodiments, the individual profile store 210 may include at least 5,000,000 data records in the form of user profiles and each user profile may be associated with one or more inheritance datasets and one or more genealogical data entries. In some embodiments, the individual profile store 210 may include at least 10,000,000 data records in the form of user profiles and each user profile may be associated with one or more inheritance datasets and one or more genealogical data entries.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from the genetic data extraction service server 125. The genetic data extraction service server 125 may perform laboratory analysis of biological samples of users and generate sequencing results in the form of digital data. The sample pre-processing engine 215 may receive the raw inheritance datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's inheritance dataset. In some embodiments, the SNPs may be autosomal SNPs. In some embodiments, 700,000 SNPs may be identified in an individual's data and may be stored in genetic data store 205. Alternatively, in some embodiments, an inheritance dataset may include at least 10,000 SNP sites. In another embodiment, an inheritance dataset may include at least 100,000 SNP sites. In yet another embodiment, an inheritance dataset may include at least 300,000 SNP sites. In yet another embodiment, an inheritance dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases a diploid inheritance dataset into a pair of haploid inheritance datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to conditions and other constraints in sequencing or microarray genotyping, a DNA identification result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's inheritance datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long genomic distance accuracy and cross-chromosome accuracy in terms of haplotype separation. For example, in some embodiments, an IBD-phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of sub-cluster pairs of first parental groups and second parental groups. Each sub-cluster pair may be in a window. The window may correspond to a genomic segment and has a similar concept of window used in the ethnicity estimation engine 245 and the rest of the disclosure related to HMMs, but how windows are precisely divided and defined may be the same or different in the phasing engine 220 and in an HMM. Each sub-cluster pair may correspond to a genetic locus. In some embodiments, each sub-cluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of sub-cluster pairs). Generating the super-cluster of the parental side may include generating a candidate parental side assignment of parental groups across a set of sub-cluster pairs that represent a set of genetic loci in the plurality of genetic loci. The computing server 130 may determine the number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720, 229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish who immigrated to America in 1800, Irish who immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their inheritance datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, inheritance datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's inheritance dataset belongs or does not belong to the community of interest. A multi-class classifier such as a neural network may also be trained to determine whether the target individual's inheritance dataset most likely belongs to one of several possible genetic communities.

Reference panel sample store 240 stores reference panel samples for different genetic communities. A reference panel sample is the genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some inheritance datasets include alleles that are commonly present among members of the community. Reference panel samples may be used to train various machine learning models in classifying whether a target inheritance dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., containing fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times the node is sampled, the inheritance dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors were born at a certain birthplace. The computing server 130 may also draw sequence data from the Human Genome Diversity Project (HGDP). Various candidates may be manually screened based on their family trees, relatives' birth location, and other quality controls. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of an inheritance dataset of a target individual. The inheritance datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target inheritance dataset into a plurality of windows (e.g., about 1000 windows). Each window includes a small number of SNPs (e.g., 300 SNPs). The ethnicity estimation engine 245 may use a directed acyclic graph model to determine the ethnic composition of the target inheritance dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target inheritance dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target inheritance dataset by determining the label compositions of the nodes that are included in the determined path. U.S. Pat. No. 10,558,930, entitled "Local Genetic Ethnicity Determination System," granted on Feb. 11, 2020, and U.S. Pat. No. 10,692,587, granted on Jun. 23, 2020, entitled "Global Ancestry Determination System" describe different example embodiments of ethnicity estimation.

The tree management engine 250 performs computations and other processes related to users' management of their data trees such as family trees. The tree management engine 250 may allow a user to build a data tree from scratch or to link the user to existing data trees. In some embodiments, the tree management engine 250 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 250 may receive an inheritance dataset from the target individual as input and search related individuals that are IBD-related to the target individual. The tree management engine 250 may identify common ancestors. Each common ancestor may be common to the target individual and one of the related individuals. The tree management engine 250 may in turn output potential family trees to which the target individual may belong by retrieving family trees that include a common ancestor and an individual who is IBD-related to the target individual.

The tree management engine 250 may further identify one or more probable positions in one of the potential family trees based on information associated with matched genetic data between the target individual and those in the potential family trees through one or more machine learning models or other heuristic algorithms. For example, the tree management engine 250 may try putting the target individual in various possible locations in the family tree and determine the highest probability position(s) based on the inheritance dataset of the target individual and inheritance datasets available for others in the family tree and based on genealogy data available to the tree management engine 250. The tree management engine 250 may provide one or more family trees from which the target individual may select. For a suggested family tree, the tree management engine 250 may also provide information on how the target individual is related to other individuals in the tree. In a manual tree building, a user may browse through public family trees and public individual entries in the genealogy data store 200 and individual profile store 210 to look for target relatives that can be added to the user's family tree. The tree management engine 250 may automatically search, rank, and suggest individuals for the user conduct manual reviews as the user makes progress in the front-end interface 260 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

The front-end interface 260 may render a front-end platform that displays various results determined by the computing server 130. The platform may take the form of a genealogy research and family tree building platform and/or a personal DNA data analysis platform. The platform may also serve as a social networking system that allows users and connect and build family trees and research family relations together. The results and data may include the IBD affinity between a user and another individual, the community assignment of the user, the ethnicity estimation of the user, phenotype prediction and evaluation, genealogy data search, family tree and pedigree, relative profile and other information.

The front-end interface 260 may allow users to manage their profile and data trees (e.g., family trees). The users may view various public family trees stored in the computing server 130 and search for individuals and their genealogy data via the front-end interface 260. The computing server 130 may suggest or allow the user to manually review and select potentially related individuals (e.g., relatives, ancestors, close family members) to add to the user's data tree. The front-end interface 260 may be a graphical user interface (GUI) that displays various information and graphical elements.

The front-end interface 260 may take different forms. In one case, the front-end interface 260 may be a software application that can be displayed on an electronic device such as a computer or a smartphone. The software application may be developed by the entity controlling the computing server 130 and be downloaded and installed on the client device 110. In another case, the front-end interface 260 may take the form of a webpage interface of the computing server 130 that allows users to access their family tree and genetic analysis results through web browsers. In yet another case, the front-end interface 260 may provide an application program interface (API). In some embodiments, the front-end interface 260 may be rendered as part of the content in an extended reality device, such as a head-mounted display or a phone camera that is integrated with augmented reality features.

The front-end interface 260 may provide various front-end visualization features. In some embodiments, a family tree viewer may render family tree built by users and/or managed by the tree management engine 250. The family tree may be displayed in a nested nodes and edges connected based on family relationships or genetic matches determined by various genetic data analysis engines discussed in FIG. 2. The family trees may include attached records that are part of records in the genealogy data store 200, including records that are uploaded by users and gallery images. The user may assign a focal person to a family tree and the family tree is displayed with the focus (such as positioning the focal person at the center or relative prominent position of the tree) around the focal person. A user may change the focal person and the family tree may shift accordingly based on the relationships and relative positions of members in the family tree. Each person in the family tree may be associated with historical photos from gallery images, historical genealogy records such as life event records, one or more stories and live events associated with the person, and metadata such as family relationships and other family trees associated with the person.

In some embodiments, visualization features provided by the front-end interface 260 may include a map feature. A map may be a geographical map that may take the form of a digital map, a historical physical map, and/or a historical map overlaid on a digital map. A user may select a geographical location and the front-end interface 260 displays relevant genealogical or genetic records associated with the location, such as an ancestor's lifetime events, birth locations of DNA matches, migration patterns of ancestors across different locations over time and associated genealogical records, residence maps that provide specific locations of historical persons' events, and historical maps overlaying on a digital map to contextualize ancestors' records and events. The map feature may also provide interactive features to allow users to view historical documents, photographs, and stores associated with the geographical locations. The map feature may also allow users to adjust timeframes, displaying changes in locations and migrations over different periods.

In some embodiments, visualization features provided by the front-end interface 260 may include a story feature that provides multimedia narratives about a person, such as the person's life events and family history. The story feature allows a user to compile various graphical and genealogical elements such as photos, documents, historical records, and personal anecdotes into a timeline to summarize a narrative. The story may be arranged in an appropriate spatial manner such as a linear arrangement that arranges various graphical elements based on the creator's selection.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees. The model store 275 may be used to store machine learning models. In some embodiments, the machine learning models may be received from users. In some embodiments, the machine learning models may be received from and trained by the model training engine 270. The model training engine 270 may be used to train any machine learning model. The machine learning models may be any model disclosed in the present disclosure such as, but not limited to, a regression model, a random forest classifier, a support vector machine and a neural network.

The model store 275 may be used to store machine learning models. In one embodiment, the machine learning models may be received from users. In another embodiment, the machine learning models may be received from and trained by the model training engine 270. The model training engine 270 may be used to train any machine learning model. The machine learning models may be any model disclosed in the present disclosure such as, but not limited to, a regression model, a random forest classifier, a support vector machine, and a neural network.

In this disclosure, a genetic dataset may be an example of inheritance data. An individual may be an example of a named entity. A target individual may be an example of a first named entity. A target relative may be an example of a second named entity. A genetic match may be a data match. A familial relationship may be a data-origin link. A meiosis separation may be a shared classification-data segment. A meiosis-separation relationship may be a data-classification link. A genetic sequence may be an example of data string or bit string. A genetic segment may be an example of data-string segment. A matched genetic segment may be an example of matched-data string. For example, an IBD segment may be an example of a matched-data-string segment. A phenotype may be an example of a data manifestation. A reproductive event may be an example of a data-inheritance event. A family tree may be a data tree. A grandparent-grandchild relationship may be a shared source-data link. A half-siblings relationship may be a semi-shared source-data link. An aunt-niece relationship, an uncle-nephew relationship, or any combination therein may be examples of collateral source-data links.

Determination of Familial Relationships

FIG. 3 is a flowchart depicting an example process 300 for determining a familial relationship between a target individual and a target relative, in accordance with some embodiments. Various steps in the process 300 may be processes that are performed by the IBD estimation engine 225, the model training engine 270 or other engines in the computing server 130. Various processes may be implemented as one or more software algorithms. The software algorithm may be stored as computer instructions that are executable by one or more general processors (e.g., CPUs, GPUs). The instructions, when executed by the processors, cause the processors to perform various steps described. In various embodiments, one or more steps described may be skipped or changed. Steps described in FIG. 3 may also be combined with those in other figures. A computer-implemented process may be performed by the computing server 130, although the process may also be performed by another suitable computer.

The computer server 130 may receive 310 a genetic dataset associated with a first named entity, i.e. a first named entity genetic dataset. While in the discussion below the target individual is used as the main example of the first named entity, various embodiments may also apply to other suitable named entities. A target individual may be a user, a non-user, or any present or historical individual that has a record or profile in the computing server 130. The genetic dataset may be any suitable type of genetic dataset stored in the genetic data store 205, such as an unphased genotype or one or a phased pair of haplotypes.

The computer server 130 may also receive 320 a genetic dataset associated with a target relative, i.e. a target relative genetic dataset. The target relative may be a target relative of the target individual. The genetic dataset associated with the second named entity, as with the genetic dataset associated with the first named entity, may be any suitable type of dataset, such as a genetic dataset in the genetic data store 205, such as an unphased genotype or one or a phased pair of haplotypes. In embodiments, the genetic datasets of the first and second named entities may be of a same format (i.e., both comprise a pair of phased haplotypes), or may be different dataset types or formats as suitable.

The target relative can be any present or historical individual that has a record or profile in the computing server 130. In some embodiments, the datasets may be received from users of the computing server 130. The datasets may also be received or retrieved from the genetic data store 205. In an embodiment, a target individual genetic dataset is received from a user and a target relative genetic dataset is retrieved from the genetic data store 205.

Each dataset may include a pair of data-value sequences. For example, in the context of genetic data, the pair of data-value sequences may be a diploid genotype sequence or a pair of phased haplotype sequences that are retrieved from the genetic data store 205. The computing server 130 may store and retrieve datasets of different users who took DNA tests and have the DNA-derived data stored with the computing server 130. The datasets may correspond to or be derived from DNA data of a target individual or relative, which may be phased or unphased. The computing server 130 may also store other datasets that correspond to DNA data of other individuals.

Tables 1 and 2 below illustrate examples of how the pair of data-value sequences in a genetic dataset may be represented. Each individual's phased genotype data may be represented as a list of ordered pairs of alleles corresponding, e.g., to a list of biallelic SNPs. Each SNP in that list has one of its two alleles encoded as 0, and the other allele specified as being encoded as 1.

TABLE 1

| SNP | Allele represented as 0 | Allele represented as 1 |
|---|---|---|
| SNP #1 | A | G |
| SNP #2 | A | G |
| SNP #3 | A | G |
| SNP #4 | A | C |
| SNP #5 | A | G |
| SNP #6 | G | T |
| SNP #7 | A | G |
| SNP #8 | A | G |
| SNP #9 | A | G |
| SNP #10 | A | G |

For instance, if there are 10 SNPs in the list as shown in the table above, the individual's phased genotype data may be represented as the following:

TABLE 2

| | SNP | | | | | | | | | |
|---|---|---|---|---|---|---|---|---|---|---|
| | SNP #1 | SNP #2 | SNP #3 | SNP #4 | SNP #5 | SNP #6 | SNP #7 | SNP #8 | SNP #9 | SNP #10 |
| Phased genotype | (0, 0) | (0, 0) | (1, 1) | (0, 1) | (0, 1) | (1, 0) | (0, 0) | (1, 1) | (0, 0) | (0, 0) |

Note that the values are ordered, and (0,1) is not the same data as (1,0). A sequence of values ($\in \{0,1\}$) in either the first or second position in the data is referred to as phased haplotype data (or just "haplotype"). For instance, there is a haplotype <1,0,0,1,0> in the above table that is the allele in the first position for SNPs #3-#7 inclusive. There is another haplotype for that same range of SNPs, which represents the alleles in the second position. The other haplotype is <1,1, 1,0,0>. The pair of phased haplotypes may be associated with a named entity, such as the target individual or the target relative.

Referring back to FIG. 3, the computing server 130 may identify 330 a plurality of genetic matches, each genetic match being a named entity such as an individual whose genetic data matches the target individual genetic dataset, the target relative genetic dataset, or both. In some embodiments, a genetic match may be a DNA tester with a genetic dataset stored in the genetic data store 205 determined by computing server 130 to be likely related to the target individual, the target relative, or both. That is, a DNA tester may be a user who has completed a DNA test that extracts DNA data of the user through, for example, the genetic data extraction service server 125, and has their genotype or haplotype data stored in the genetic data store 205. The computing server 130 may process genetic data of other individuals who did not take a DNA test. For example, such genetic data may be entered or uploaded directly into the data store of the computing server.

Using IBD estimation engine 235, the computing server 130 may determine the length of IBD segments shared between a pair of named entities, such as by a user and another individual. The IBD segments may be identified using, e.g., the IBD Estimation Engine 225 and may be stored in the IBD Network Data Store 235, in embodiments. The computing server 130 may select one or more individuals as potential DNA matches of the target individual, the target relative, or both based on one or more suitable selection criteria. For example, the criteria may be the number of shared IBD segments and/or cumulative or segment-specific shared cM being higher than a threshold, the compared individuals being closely related in an IBD community as determined by community assignment engine 230, or other suitable conditions.

In some embodiments, to identify a plurality of genetic matches such that each genetic match is an individual whose genetic data matches the target individual genetic dataset, the target relative genetic dataset, or both, the computing server 130 may determine a meiosis-separation relationship between the target individual and the target relative based on a degree of match between the target individual genetic dataset and the target relative genetic dataset. The degree of separation may be denoted as M1, M2, M3, M4, etc., which respectively signifies a first degree of meiosis separation, a second degree of meiosis separation, etc. In embodiments, the computing server 130 may make an initial determination that a target individual and a target relative are M3 matches on the basis of the cM of IBD shared between the target individual and target relative falling within a predetermined range of cM shared for M3 matches. At this point, however, the particular relationship between the target individual and the target relative—whether it be of a half-sibling, grandparent, or avuncular nature—remains indeterminate.

In some embodiments, and as seen below in Table 3, a "first degree of meiosis separation," "one-meiosis-event relationship," or "M1 relationship" corresponds to a parent-child relationship, a "second degree of meiosis separation," "two-meiosis-event relationship," or "M2 relationship" corresponds to a full sibling relationship, a "third degree of meiosis separation," "three-meiosis-event relationship," or "M3 relationship" corresponds to half-sibling, grandparent-grandchild, or avuncular relationship, a "fourth degree of meiosis separation," "four-meiosis-event relationship," or "M4 relationship" corresponds to a first cousin, great grandparent to grandchild, half avuncular, or great avuncular relationship, a "fifth degree of meiosis separation," "fivemeiosis-event relationship," or "M5 relationship" corresponds to a first cousin once removed, half first cousin, or half great avuncular relationship, a "sixth degree of meiosis separation," "six-meiosis-event relationship" or "M6 relationship" corresponds to a second cousin, first cousin twice removed, or half first cousin once removed relationship, a "seventh degree of meiosis separation," "seven-meiosis-event relationship" or "M7 relationship" corresponds to a second cousin once removed, half second cousin, first cousin thrice removed, or half first cousin once removed relationship, an "eighth degree of meiosis separation," "eight-meiosis-event relationship," or "M8 relationship" corresponds to a third cousin, or a second cousin twice removed relationship, and a "ninth degree of meiosis separation," "nine-meiosis-event relationship," or "M9 relationship" corresponds to a third cousin once removed, or second cousin thrice removed relationship, and so on.

TABLE 3

| Number of Meiosis Events | Abbreviation | Possible Relationships |
| --- | --- | --- |
| One-meiosis-event relationship | M1 | Parent-child |
| Two-meiosis-event relationship | M2 | Full Siblings |
| Three-meiosis-event relationship | M3 | Half-sibling, Grandparent, Avuncular |
| Four-meiosis-event relationship | M4 | First cousin, Great grandparent, Half avuncular, Great Avuncular |
| Five-meiosis-event relationship | M5 | First cousin once removed, Half first cousin, Great-great avuncular, Great-great grandparent |
| Six-meiosis-event relationship | M6 | Second cousin, First cousin twice removed, Half first cousin once removed, Half two-generation avuncular, Three-generation grandparent |
| Seven-meiosis-event relationship | M7 | Second cousin once removed, Half second cousin, First cousin thrice removed, Half first cousin twice removed, Four-generation avuncular, Half three-generation avuncular, Four-generation grandparent |
| Eight-meiosis-event relationship | M8 | Third cousin, Second cousin twice removed, Half second cousin once removed, First cousin four times removed, Half first cousin three times removed, Five-generation avuncular, Half four-generation avuncular, Five-generation grandparent |
| Nine-meiosis-event relationship | M9 | Third cousin once removed, Half third cousin, Second cousin thrice removed, Half second cousin twice removed, First cousin five times removed, Half first cousin four times removed, Six-generation avuncular, Half five-generation avuncular |
| Ten-meiosis-event relationship | M10 | Fourth cousin, Third cousin twice removed, Half third cousin once removed, Second cousin four times removed, Half second cousin thrice removed, First cousin six times removed, Half first cousin five times removed, Seven-generation avuncular, Half six-generation avuncular |

In some embodiments, M3 relationship predictions (e.g., those pertaining to grandparent/avuncular/half-sibling relationships) are predicted using a logistic regression approach. M4-M7 relationships, by contrast, are predicted using a k-nearest neighbors approach. While logistic regression for M3 relationship predictions and k-nearest neighbors for M4-M7 relationships are described, it will be appreciated that the disclosure is by no means limited thereto. Rather, any suitable approach or combination of approaches may be used for any suitable level of relationship. For example, both logistic regression and k-nearest neighbor may be performed in parallel for M3-M7 relationship predictions, with a suitable prediction selected therebetween. In embodiments, XGBoost or random forest machine learning approaches may be utilized for distinguishing between different M3 relationships.

Features for performing relationship predictions may be drawn from user data, e.g., based on the cumulative or segment-specific cM and/or number of segments shared between datasets, age differences between target and match, etc. One or more machine-learned models for performing the prediction may be trained using data obtained from, e.g., a stitched genealogical tree database. The stitched genealogical tree database may comprise one or more distinct databases comprising, e.g., a genealogical tree database and a stitched tree database comprising a stitched tree formed from stitched-together genealogical trees. In the stitched tree, entity resolution is and/or has been performed to cluster together instances of the same individual occurring in separate trees.

It was surprisingly found that relying upon the relationships of the target individual and the target relative to a plurality of matches provides improved resolution of relationship types, as these relationships advantageously can be utilized, by a trained machine learning model, to elucidate the nature of the relationship between the target individual and target relative. In fact, it was surprisingly found that matches, such as common matches, provided better resolution of the nature of the relationship between the target individual and the target relative than additional features that could be derived from the target individual and the target relative.

In some embodiments, the computing server 130 may identify the plurality of genetic matches based on the determined meiosis-separation relationship such that the plurality of genetic matches each have a meiosis-separation relationship with the target individual or the target relative that is different from the meiosis-separation relationship between the target individual and the target relative. For example, in some embodiments, the computing server 130 may determine that the meiosis-separation relationship between the target individual and the target relative is M3. The computing server 130 in turn may identify and/or filter the genetic matches to the target individual, the target relative, or both that have meiosis-separation relationships that are not M3 (e.g., M4, M5, M6, etc.).

Likewise, in some embodiments, the computing server 130 may determine that the meiosis-separation relationship between the target individual and the target relative is M4. The computing server 130 in turn may identify the genetic matches to the target individual, the target relative, or both that have meiosis-separation relationships that are not M4, (e.g., M3, M5, M6, etc.). In some embodiments, M1 and M2 relatives to either or both individuals may not be selected. While in some embodiments the genetic matches that have the same degree of separation are not selected, in other embodiments those genetic matches are also selected. For example, if the target individual and the target relative have the M4 relationship, the computing server 130 may still include genetic matches for M4.

Meiosis separation represents a degree of relatedness of two individuals and may be defined by the number of meiosis events that separate two individuals. Meiosis may be characterized as the number of reproductive events separating two individuals, and as a result, meiosis is an integer greater than or equal to zero. For example, meiosis between a person and her identical twin is zero. For example, meiosis between a parent and child is one, because they are separated by one reproductive event. In another example, the number of meiosis events between two full siblings is two, because two meiosis events separate two full siblings through the path: sibling 1, parent, sibling 2.

Thus, meiosis separation may be defined as an estimated number of meiosis separations through a common ancestor between the target individual and the target relative. For two individuals whose family relationships are known, the computing server 130 first may identify the most-recent common ancestor (MRCA) between two individuals. For example, the estimated degree of relatedness between first cousins may be M4 because the MRCA in this example is one of the grandparents. The meiosis separations include (i) descendant A-parent A, (ii) parent A-common grandparent, (iii) common grandparent-parent B, and (iv) descendant B-parent B. In another example, the estimated degree of relatedness between an aunt-niece relationship may be M3 because the MRCA here is the parent of the aunt (grandparent of the niece), with meiosis separations that include (i) niece-parent, (ii) parent to grandparent, and (iii) grandparent to aunt.

However, while the computing server 130 may compare two individuals' genetic data, in many situations the precise familial relationship between the two individuals is unknown to the computing server 130. For example, using the IBD estimation engine 225 that determines a large degree of overlap in the genetic data between two individuals, the computing server 130 may determine that the two individuals are close relatives, but the precise relationship is unknown, either because there is no family tree available or the precise positions of the two individuals in a family tree are unknown or unconfirmed.

When the genetic data of two individuals are available but the precise familial relationship is unknown, the number of meiosis separations between two individuals may be estimated based on the amount of IBD shared between the pair of individuals. For example, the computing server 130 may determine which degree of separation the total length of shared DNA (e.g. in cM) and/or the total number of shared segments between the two individuals corresponds to. The letter "w" denotes the cumulative or segment-specific length of the shared identical-by-descent (IBD) segments between a pair of descendants in a pairwise genetic relationship. These IBD segments represent portions of DNA that are determined to have been inherited from a common ancestor. The length of these shared IBD segments may be used to calculate relationship scores, which are then further analyzed to determine the degree of relatedness between individuals within a family tree. The letter "m" denotes the estimated degree of relatedness between a pair of descendants in a pairwise genetic relationship. The degree of relatedness may be determined based on an estimated number of meiosis separations between the pairs of descendants through a common ancestor. This value, m, may be used in conjunction with the length of shared IBD segments (denoted by "w") to calculate relationship scores, which can be used to determine the overall confidence level of relatedness between individuals within a family tree. In some embodiments, the relationship score may correspond to a conditional probability of the estimated degree of relatedness, m, given the length of the shared IBD segments, w. The conditional probability may be denoted as Pr(m|w). In particular, Pr(m|w) denotes the conditional probability of the estimated degree of relatedness 'm', given the length of the shared IBD segments 'w'. In other words, Pr(m|w) represents the probability of observing a particular degree of relatedness 'm' between two individuals when the length of their shared IBD segments is 'w'. This conditional probability can play a crucial role in determining relationship scores, which are used to assess overall confidence levels of relatedness between individuals within a family tree.

Calculating m

In some embodiments, the meiosis-separation relationship between two individuals may be directly based on the bucket in which the total length of shared IBD segments of the two individuals' genetic data fall. For example, M4 relationships may have a range between A cM and B cM and if the total length of shared IBD segments is between A and B, the computing server 130 may determine that the meiosis-separation relationship is M4. As suggested above, disambiguating which of the plurality of relationships that correspond to a particular meiosis-separation relationship is a nontrivial problem that plagues the direct-to-consumer genomics industry, as the degree of overlap between relationships like avuncular, grandparent/grandchildren, and half-sibling is of manifest importance to users investigating their family trees but is notoriously difficult to disambiguate on the basis of cumulative IBD cM shared. Hence the approach disclosed in embodiments of the disclosure of inferring a relationship type is particularly advantageous and solves a long-felt need.

In some situations, some of the genetic matches may have sufficient family-tree data available between the match and the target (whether it is the target individual or the target relative). In such a case, the meiosis-separation relationship may also be determined based on the family data. The evaluation of evidence depends on how m, the tree relationship, is calculated. For a simple case, which is a full relationship with only one pair of observed common ancestors, m is the number of hops between the two individuals (e.g., 1st cousins are M4). A "hop" can be considered a reproductive event. Each hop can represent a single generational connection between two individuals, such as a parent-child relationship. The number of hops helps estimate the number of meiosis separations between individuals through their common ancestor(s).

More complicated relationships can be fit into the framework below. (1) For any half relationship between two individuals, use the $m(x+1)$ distribution. (2) Inbreeding or endogamy adds another path to the common ancestor couple. This acts the same as if there was a completely different ancestor. For example, m8wm6 mg (m8 relationship with an m6 marriage in one of the lines) is the same as m8+m8. If the cousin marriage happens on a path that is longer than the closest path, then that is reflected accordingly (i.e. m8+m9). (3) $2m(x)$ is equal to $m(x-1)$. That is, m8+m8=m7. (4) $m(x)+m(x+1)$ is equal to a distribution halfway between the $m(x)$ and $m(x-1)$ distributions. In this case, the higher score between the distributions should be used. (5) $m(x)+m(x+y)$ where $y>1$ is very close to the $m(x)$ distribution. This distribution or the max between the $m(x)$ and $m(x-1)$ distributions could be used.

For example, consider the following relationship:

$$m7 + m8 + m8wm7mg + m9 + m9wm6mg + m10 + m10 + m11$$

The above relationship can be simplified by first expanding the marriage inbreeding relationships:

$$m7 + m8 + m8 + m9 + m9 + m9 + m9 + m10 + m10 + m11$$

The relationship can be further simplified by considering the combinations of relationships, highest relationships first:

$$m7 + m8 + m8 + m9 + m9 + m9 + m9 + m9 + m11$$

$$m7 + m8 + m8 + m8 + m9 + m9 + m9 + m11$$

$$m7 + m8 + m8 + m8 + m8 + m9 + m11$$

$$m7 + m7 + m8 + m8 + m9 + m11$$

$$m7 + m7 + m7 + m9 + m11$$

$$m6 + m7 + m9 + m11$$

The relationship distribution is expected to be between the m6 and m7 distributions. The computing server 130 may run both m6-specific and m7-specific trained models and take the maximum score.

The estimated degree of relatedness may be determined based on an estimated number of meiosis separations between the pairs of descendants in a particular pairwise genetic relationship. The computing server 130 may count the estimated number of meiosis separations through a common ancestor between the pair of descendants. The computing server 130 first may identify the most recent common ancestor (MRCA) between the pair of descendants. For example, the estimated degree of relatedness between first cousins may be four because the MRCA in this example is one of the grandparents. The meiosis separations include (i) descendant A-parent A, (ii) parent A-common grandparent, (iii) common grandparent-parent B, and (iv) descendant B-parent B. In another example, the estimated degree of relatedness between an aunt-niece relationship may be three because the MRCA here is the parent of the aunt (grandparent of the niece).

In some embodiments, the values of the conditional probability may be determined based on Bayes' Law. For example, Pr(m|w)=Pr(w|m)*Pr(m)/Pr(w).

The formula Pr(m|w)=Pr(w|m)*Pr(m)/Pr(w) represents the relationship between the conditional probabilities:

Pr(m|w) is the conditional probability of the estimated degree of relatedness 'm' given the length of shared IBD segments 'w'.

Pr(w|m) is the conditional probability of observing the length 'w' of the shared IBD segments given the degree of relatedness 'm'.

Pr(m) is the prior probability of the degree of relatedness 'm' occurring.

Pr(w) is the probability of observing the length 'w' of the shared IBD segments.

By applying Bayes' Law to these probabilities, the system can calculate Pr(m|w), the probability of a particular degree of relatedness 'm' given the observed IBD segment length 'w'. This probability can then be used to determine the relationship scores, which aid in assessing the overall confidence level of relatedness between individuals within a family tree.

In some embodiments, regarding Pr(w|m), the computing server 130 may retrieve known confirmed relatives from its genealogy data store 205 (e.g., known pairs of relatives with a confirmed m) and determine the length of the shared IBD segments, w.

Based on a large number of known confirmed relatives, a distribution of Pr(w|m) may be determined and stored in the memory of the computing server 130. In some embodiments, regarding Pr(m), the computing server 130 may treat the degree of relatedness as uniformly distributed until m equals a threshold number, such as m=12. This means that the prior probability Pr(m) of the degree of relatedness 'm' is the same for all values of 'm' up to the threshold number. When the degree of relatedness 'm' exceeds the threshold, the relatedness between the pair of relatives is considered too distant or too weak to be relevant.

In some embodiments, regarding Pr(w), the computing server 130 may sample the genetic data in the genetic data store 210 to build a distribution of the length of shared IBD segments among various users of the computing server 130. The distribution may be stored in the memory of the computing server 130. Based on Bayes' Law, the distribution of Pr(m|w) may be determined as a table and stored in a memory.

In some embodiments, in identifying 330 the plurality of genetic matches, the computing server 130 may take the estimated meiosis-separation relationships into account in selecting those genetic matches. For example, in some embodiments, the number of genetic matches is higher for more-distant relationships. As such, in a genetic data store 205, it is generally expected (although not always true) there are more M4 genetic matches for a particular target individual and/or target relative than M3 genetic matches, and more M5 genetic matches than M4 genetic matches, and so on. As discussed in further detail below, the computing server 130 may use a large number of genetic matches that have meiosis-separation relationships farther from the meiosis-separation relationship between the target individual and the target relative as source data to determine the familial relationship between the target individual and the target relative.

Referring back to FIG. 3, the computing server 130 may extract 340 features from the plurality of genetic matches. In some embodiments, the computing server 130 may determine a first length of IBD segments shared by the target individual and a genetic match, a second length of IBD segments shared by the target relative and the genetic match, and a length difference of IBD segments based on the first length of IBD segments and the second length of IBD segments.

The computing server 130 may also determine a first number of IBD segments shared by the target individual and a genetic match, a second number of IBD segments shared by the target relative and the genetic match, and a number difference of IBD segments based on the first number of IBD segments and the second number of IBD segments.

The computing server 130 may also determine a first number of meiosis separations between the target individual and a genetic match, a second number of meiosis separations between the target relative and the genetic match, and a number difference of meiosis separations based on the first number of meiosis separations and the second number of meiosis separations. For instance, in some embodiments, the computing server 130 may determine the first and second numbers of meiosis separations on the basis of one or both of the first and second lengths of IBD segments shared and/or the first and second number of IBD segments shared between the target individual and the target relative and the genetic match, respectively. Thus, for example, a genetic match may be determined to be an M4 match to the target individual, based on e.g. the length of IBD segments shared therebetween, but an M5 match to the target relative based on e.g. the length of IBD segments shared therebetween.

Then, the computing server 130 may extract features for the genetic match of the plurality of genetic matches from the length difference of IBD segments, the number difference of IBD segments, and/or the number difference of meiosis separations.

The features may include: a mean, a median, a standard deviation, a maximum, and/or a minimum of the length differences of IBD segments; a mean, a median, a standard deviation, a maximum, and/or a minimum of the number differences of IBD segments; and/or a mean, a median, a standard deviation, a maximum, and/or a minimum of the number difference of meiosis separations.

Table 4 and Table 5 below illustrate an example of how features are extracted from a plurality of genetic matches whose genetic data match the target individual genetic dataset, the target relative genetic dataset, or both.

In Table 4, the target individual is "Person 1" and the target relative is "Person 2." The genetic matches whose genetic data match Person 1's genetic dataset, Person 2's genetic dataset, or both are shown as Genetic Match #1, 2, [ . . . ], 30.

Referring to Table 4, a first length of IBD segments shared ("cM shared 1") by Person 1 and Genetic Match #1 and a second length of IBD segments shared ("cM shared 2") by Person 2 and Genetic Match #1 are shown. Referring now to Table 5, a length difference of IBD segments ("cM difference") based on the first length of IBD segments ("cM shared 1") and the second length of IBD segments ("cM shared 2") is shown.

the number difference of IBD segments, and/or the number difference of meiosis separations. The features may include: a mean, a median, a standard deviation, a maximum, and/or a minimum of the length differences of IBD segments for Genetic Match #1, 2, [ . . . ], 30; a mean, a median, a standard deviation, a maximum and/or a minimum of the number differences of IBD segments for Genetic Match #1, 2, [ . . . ], 30; and/or a mean, a median, a standard deviation, a maximum and/or a minimum of the number difference of meiosis separations for Genetic Match #1, 2, [ . . . ], 30.

Other features may also be extracted from the genetic matches. For example, any data stored in the genealogical data store 200, the genetic data store 205, and individual profile store 210 that are relevant to the genetic matches may be extracted as part of the features of those genetic matches.

Referring back to FIG. 3, the computing server 130 may input 350 the extracted features into a trained machine learning model to determine a familial relationship between the target individual and the target relative. For instance, the machine learning model may include a regression model, a gradient-boosting machine, a random forest classifier, a support vector machine, a neural network, or a model trained by an unsupervised approach as further explained below. The computing server 130 may connect the target relative and the target individual in a family tree based on the determined familial relationship. For M3 separation, the familial relationship between the target individual and the

TABLE 4

| Genetic Match # | Person 1 cM shared 1 | Person 2 cM shared 2 | Person 1 # segments 1 | Person 2 # segments 2 | Person 1 # meiosis 1 | Person 2 # meiosis 2 |
|---|---|---|---|---|---|---|
| 1 | 1536 | 2500 | 46 | 44 | 3 | 2 |
| 2 | 3500 | 2500 | 36 | 40 | 1 | 2 |
| [ . . . ] | 1795 | 2500 | 36 | 43 | 2 | 2 |
| [ . . . ] | 3280 | 2500 | 46 | 44 | 3 | 2 |
| 30 | 1870 | 2500 | 36 | 40 | 1 | 2 |

TABLE 5

| Genetic Match # | cM difference cM shared 1-cM shared 2 | # segments difference # segments 1-# segments 2 | # meiosis difference # meiosis 1-# meiosis 2 |
|---|---|---|---|
| 1 | −964 | 2 | 1 |
| 2 | 1000 | −4 | −1 |
| [. . .] | −800 | 2 | 1 |
| 30 | 1000 | −4 | −1 |

Referring to Table 4, there are shown a first number of IBD segments ("#segments 1") shared by Person 1 and Genetic Match #1 and a second number of IBD segments ("#segments 2") shared by Person 2 and Genetic Match #1. Referring now to Table 5, there is shown a number difference of IBD segments ("#segments difference") based on the first number of IBD segments ("#segments 1") and the second number of IBD segments ("#segments 2").

Referring to Table 4, there are shown a first number of meiosis separations ("#meiosis 1") between Person 1 and Genetic Match #1 and a second number of meiosis separations ("#meiosis 2") between Person 2 and Genetic Match #1. Referring now to Table 5, there is shown a number difference of meiosis separations ("#meiosis difference") based on the first number of meiosis separations ("#meiosis 1") and the second number of meiosis separations ("#meiosis 2").

Based on Tables 4 and 5, the computing server 130 may extract features from the length difference of IBD segments, target relative may be grandparent/grandchild (GP/GC); half siblings (HS); or aunt/niece, uncle/nephew or any combination therein (AV/NIB). For M4 separation, the familial relationship between the target individual and the target relative may be a first cousin, great grandparent to grandchild, half avuncular, or great avuncular relationship.

In embodiments, a model specific to M3 relationships is trained and deployed during inference, while a model specific to M4-M7 relationships is trained and deployed during inference, with relationships and features extracted therefrom as discussed above directed to one or both of the models based on, e.g., a predicted meiosis-separation level or relationship, wherein in embodiments where a relationship and features thereof are classified using two models, the highest predictive score is retained and used for a final prediction for that pair of individuals. In embodiments, models specific to a plurality of different meiosis-separation levels are trained and utilized in deployment. In embodiments, a model specific to M3 relationships, a model specific to M4 relationships, and a model specific to other (e.g. M5+) relationships may be trained and deployed as suitable. In embodiments, XGBoost may be provided as the particular model for receiving features for, e.g., M3 and M4 relationship predictions, but it will be appreciated that the disclosure is not limited thereto. Rather, the disclosed approaches may include any suitable machine learning model, such as a tree-based model or any other suitable model.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, training of machine learning models to determine familial relationships between a target individual and a target relative may be performed by the model training engine 270.

In various embodiments, the training techniques for a machine learning model may be supervised, semi-supervised, or unsupervised. In supervised learning, the machine learning models may be trained with a set of training samples that are labeled. Any one of a number of supervised learning techniques may be used to train the models. Examples include, but are not limited to, random forests and other ensemble learning techniques, support vector machines (SVM) and logistic regression. For example, for a machine learning model trained to determine familial relationships between a target individual and a target relative, the training samples may be selected features associated with a pair of individuals as explained in this disclosure. The labels for each training sample may be binary or multi-class.

In some cases, an unsupervised learning technique may be used, where the samples used in training are not labeled. Various unsupervised learning technique such as clustering may be used. In some cases, the training may be semi-supervised with training set having a mix of labeled samples and unlabeled samples.

For instance, a machine learning model may be associated with an objective function, which generates a metric value that describes the objective goal of the training process. For example, the training goal may be to reduce the error rate of the model in generating predictions. In such a case, the objective function may monitor the error rate of the machine learning model in predicting familial relationships for pairs of individuals given their corresponding datasets. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the sum of absolute differences between the predicted values and the actual value), L2 loss (e.g., the sum of squared distances).

In one aspect, the machine learning model is a random forest classifier. A random forest is an ensemble-based machine learning technique for classification. This technique is constructed using multiple decision trees that are trained to produce a probability representing a classification or label identifying the class that represents the mode of the classes of the decision trees. The mode is the value in the training dataset that appears most frequently. A random forest model RFM may consist of a fixed number of decision trees, T, that vote to predict a classification on unseen data. Each decision tree consists of a root node, multiple internal nodes referred to as split nodes, and multiple leaf nodes. Each root and split node of each tree performs a binary test on each input training data or feature vector and performs a binary test and based on the result, directs the data to the left or right child node. The leaf nodes store a probability distribution.

Figure 4:
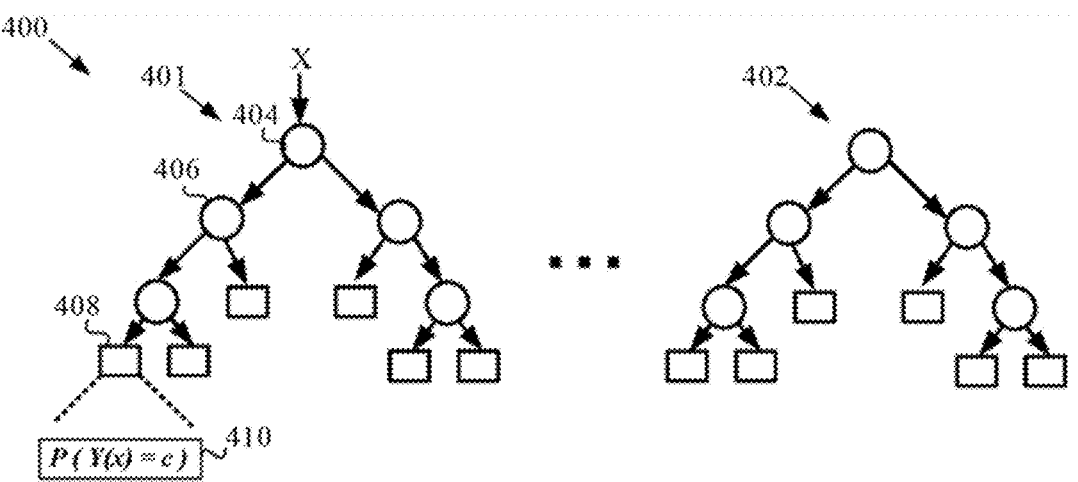
FIG. 4 depicts a random forest classification model, in accordance with an embodiment.

FIG. 4 depicts a random forest 400 having T decision trees 401, 402. A decision tree, such as tree 401, comprises a root node 404, a plurality of internal or split nodes 406, and a plurality of leaf nodes 408. Each root and split node perform a binary test on the input data and based on the result directs the data to the left or right child node. The leaf nodes store a probability distribution 410. A decision tree splits the data based on binary tests represented as if-else conditions. The binary tests divide a dataset into distinct and non-overlapping regions. The splitting decision is based on a node impurity, such as a Gini index or entropy, which measures the homogeneity of the labels at a node. Each split is chosen using a greedy algorithm that selects the best split that maximizes an information gain at each node. The information gain is the difference between the parent node impurity and the weighted sum of the two child node impurities. This is represented mathematically as follows:

$$IG(D, s) = \text{Impurity}(D) - \frac{N_{left}}{N}\text{Impurity}(D_{left}) - \frac{N_{right}}{N}\text{Impurity}(D_{right}),$$

wherein s is a split that partitions the training dataset S of size N into two datasets $D_{left}$ and $D_{right}$ of sizes $N_{left}$ and $N_{right}$, where the node impurity is $$\sum_{i=1}^{c} f_i (1 - f_i),$$

where $f_i$ is the frequency of label i at a node and C is the number of unique labels when the Gini index is used, the node impurity is $$\sum_{i=1}^{c} - f_i \log(1 - f_i),$$

when entropy is used.

In some embodiments, the model training engine 270 may use some selected features to train the machine learning model to determine a familial relationship between the target individual and the target relative. Specifically, the model training engine 270 can use a set of candidate features selected to train a corresponding model using a supervised machine learning technique. Once training is completed, the model is saved in the model store 275. The trained model is able to generate or infer, for a pair of individuals, a familial relationship in response to features associated with the pair of individuals. For example, the familial relationship for M3 relationships can be any one of: Grand Parent/Grand Child (GP/GC); Half siblings (HS); and Avuncular/Nibling (AV/NIB), Aunt/Niece, Uncle/Nephew or any combination thereof.

Figure 5A:
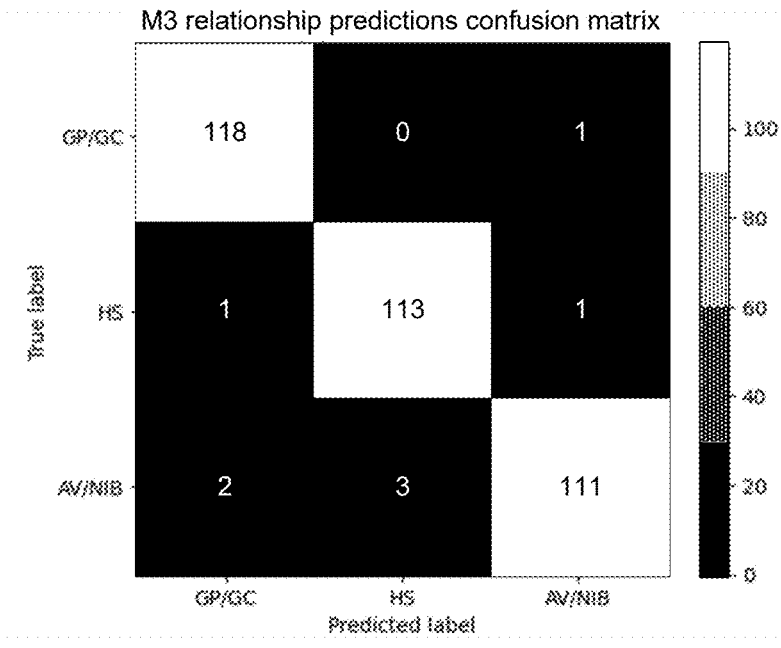
FIG. 5A depicts an M3 relationship-prediction confusion matrix, in accordance with an embodiment.

In one example, the training data may include 600 pairs of each M3 class relationships. The model may be trained using 80% of the data. The trained model exhibits a 98% accuracy as shown in FIG. 5A, which depicts an M3 relationship-prediction confusion matrix. The relationship-prediction confusion matrix is a visualization tool that enables the evaluation of the performance of the machine learning model when determining a familial relationship between a pair of individuals, with predicted labels compared with true or "ground truth" labels. As seen, the model shows similar accuracy across classes. The directionality for AV/NIB and GP/GC can be predicted with ~100% accuracy. AV and GP almost always share more with common matches (error rate <0.002%).

Figure 5B:
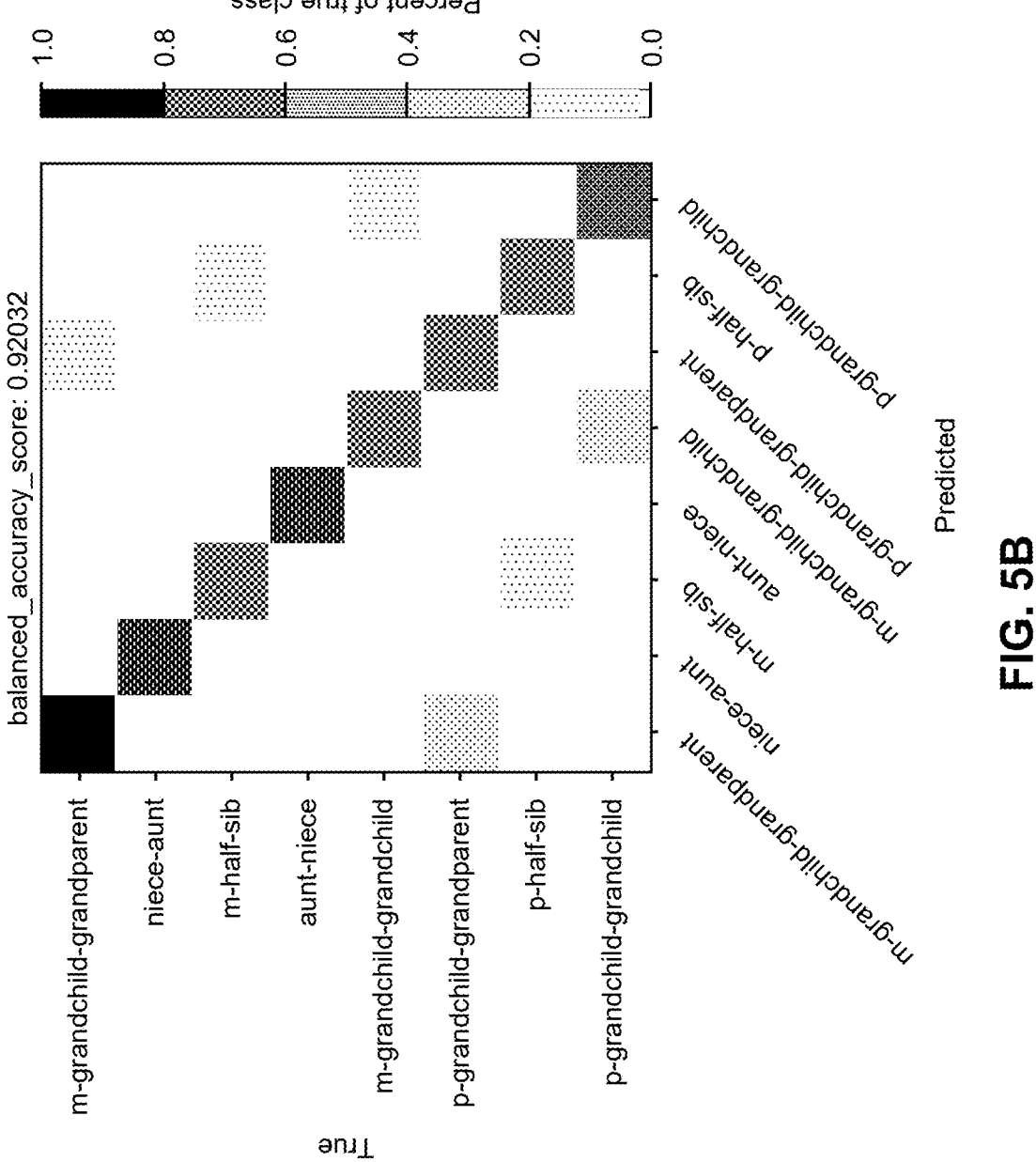
FIG. 5B depicts another M3 relationship-prediction confusion matrix, in accordance with an embodiment.

Turning now to FIG. 5B, another confusion matrix is shown. As seen in the relationship-confusion matrix in which more-granular directional categories of M3 relationships, including, as seen, maternal grandchild→grandparent, niece→aunt, maternal half-sibling, aunt→niece, maternal grandparent→grandchild, paternal grandchild→grandparent, paternal half-sibling, and paternal grandparent→grandchild. That is, relationships including paternal grandparent, maternal grandparent, paternal uncle/aunt, maternal uncle/aunt, paternal half-sibling, maternal half-sibling, nibling through brother, nibling through sister, grandchild through son, or grandchild through daughter can be accurately predicted.

It has been surprisingly found that the relationship-classification embodiments of the disclosure can distinguish not only between three broad classes of grandparental/grandchild, avuncular, and half-sibling relationships with increased accuracy relative to previous approaches, but also that directionality of relationships can be accurately determine, with high accuracy, owing to the insights that can be leveraged through features obtained from genetic matches of the target individual, target relative, or both. This level of both granularity and accuracy is unprecedented in existing approaches to relationship classification. Indeed, whereas existing approaches have struggled to get even to 75% accuracy on predicting half-sibling relationships, the approach can advantageously achieve ~99% accuracy on both grandparent and avuncular relationship predictions, while also achieving greater than 94% accuracy on half-sibling relationship prediction.

Figure 6:
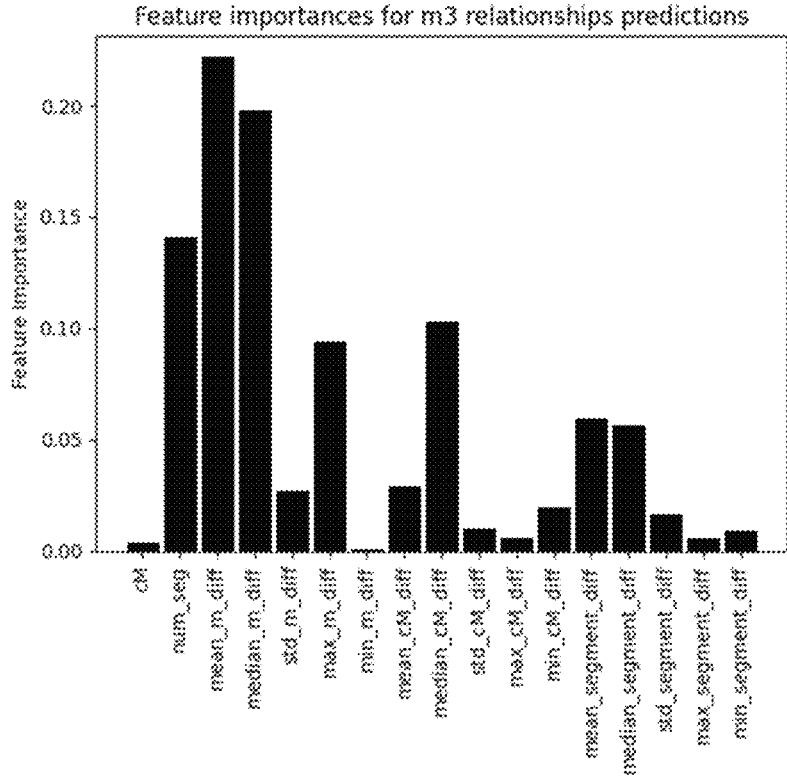
FIG. 6 illustrates a graph of feature importance for M3 relationship predictions, in accordance with an embodiment.

FIG. 6 shows feature importance for M3 relationship predictions. It has been determined, for example, that number of shared segments ("num_seg"), mean meiosis-separation difference ("mean_m_diff"), and median meiosis-separation difference ("median_m_diff") are of outsize predictive value relative to certain other features, such as cM shared ("cM") or minimum meiosis-separation difference ("min_m_diff"). This is particularly surprising given the intuitive importance of features such as cM shared. As such, the disclosed embodiments achieve a surprising result of high predictive accuracy using the described machine-learning approach, as the approach learns to rely upon counterintuitive features for disambiguating different types of notoriously noisy M3 matches.

Figure 7:
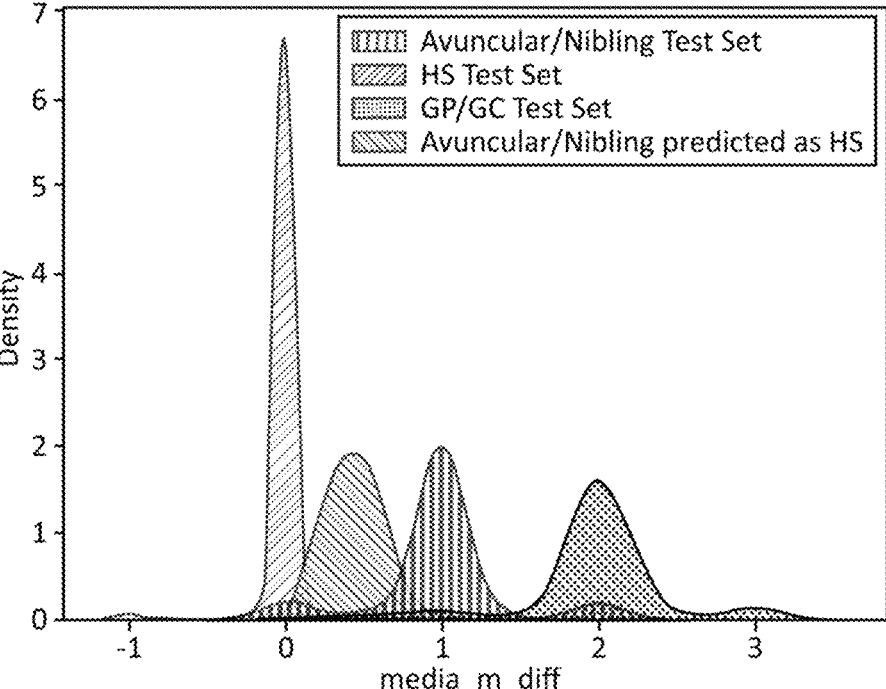
FIG. 7 illustrates a predictive feature, in accordance with an embodiment.

Further, FIG. 7 depicts one of the predictive features used: "median meiosis difference" and why it has a powerful predictive value. Shown are four peaks at values 0, 0.5, 1, and 2. The peaks at values 0, 1 and 2 have been found to all correspond to different M3 relationships. The fact that there is very little overlap of values of this feature across different relationships (predictive classes) means that this feature has high predictive value (separates the three classes). The peak at value 0.5 (red color) is for samples that were misclassified (the model predicted that it is a half-sibling relationship instead of avuncular)—likely the reason for misclassification being that the feature value for those samples was "ambiguous", or in between the peaks which correspond to half-sibling and avuncular classes (0 and 1 respectively).

In an embodiment, an M4-specific model may be trained and utilized during inference to distinguish between the vastly different relationship types that are included in M4 relationships, including great-grandparents/great-grandchildren, great-avuncular/great-nibling, first cousins, and half-avuncular/half-nibling. Differentiating between these relationship types is of vital importance when providing a user with predictions regarding their genetic matches, as mistaking a first cousin as a great-grandparent undermines a user's confidence in the accuracy of the results and sullies their emotional experience from and engagement with the relationship-prediction system. Furthermore, it is a long-standing problem that it is highly difficult to provide relationship predictions for persons who take a DNA test as described herein and who do not have close relatives who have previously taken a DNA test in the Genetic Data Store 205, as the absence of M3 and closer relatives limits the insights that can be provided from such close relationships. For such individuals, it is difficult to provide relationship predictions for their more-distant (i.e. M4+) matches as identified using existing modalities, and therefore difficult to guide such individuals to bootstrap the creation of a pedigree from which meaningful insights regarding family history can be derived.

It has been surprisingly found that the accuracy of relationship predictions for persons with M4+ matches can be greatly increased by adding to the features already described an age-difference feature. That is, an age associated with a person may be derived from metadata corresponding to that person, such as from birth date, and/or from records such as birth, marriage, and death records, associated with the person. A difference between the ages of two persons whose genetic datasets are being compared can thus be generated and utilized as a feature, in addition to, e.g., cumulative or segment-specific cM, number of shared segments, meiosis events separating the two persons (e.g. M), etc.

Figure 9:
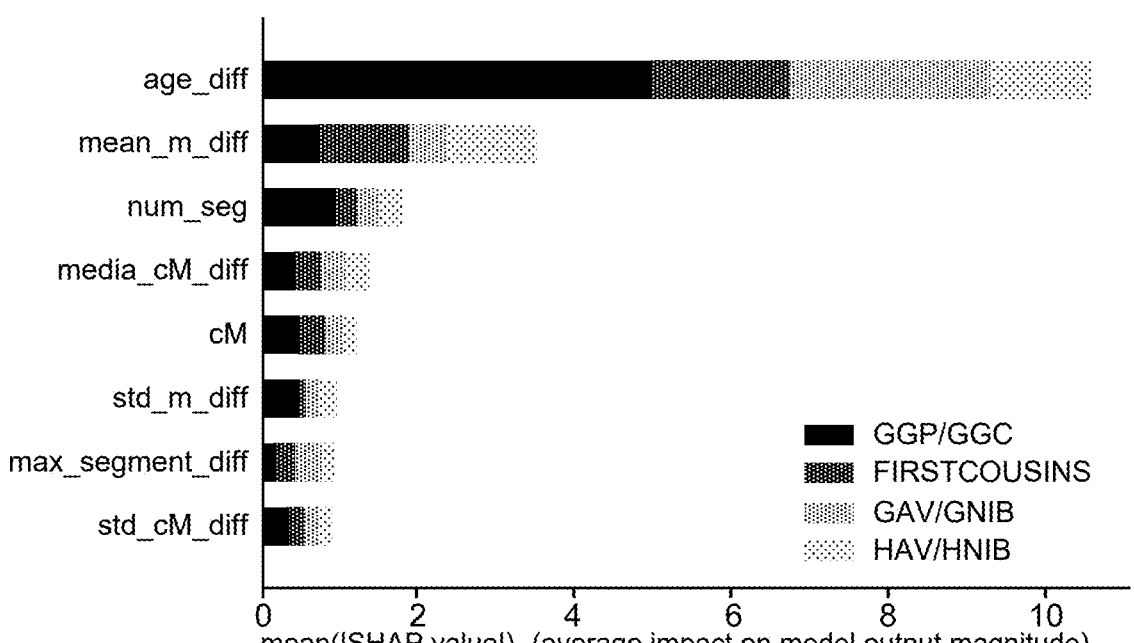
FIG. 9 depicts a graph of feature importance for M4 relationship predictions, in accordance with an embodiment.

FIG. 9 shows the influence of particular features on the prediction, using a trained model, of a relationship within an M4 classification. It was surprisingly found that the addition of age difference as a feature had an outsized impact on the prediction, particularly with great-grandparent/great-grandchild relationships, but also to a surprising degree in first cousins, great avuncular, and half-avuncular relationships. The impact of age difference as a feature was far in excess of the impact of other features, including difference in meiosis events, number of shared segments, etc. Indeed, the addition of age difference as a feature to the M4-specific model has been found to advantageously improve the prediction accuracy to greater than 90%, in some situations up to 94%, whereas previous attempts had achieved, at best, an 84% predictive accuracy.

In some embodiments, an additional feature may be utilized to predict a directionality of particular relationships. In embodiments, a target individual and a target relative are compared against common or shared matches to determine whether the target individual or the target relative has greater connectivity or relatedness to the shared matches. The degree of relatedness between the targets and the shared matches can be used to determine a directionality of the relationship. For example, a target relative who is the great-grandparent of a target individual will be expected to necessarily have a greater degree of relatedness to their progeny, which would include a target individual's shared matches with the great-grandparent, such as second cousins, who are separated from the target individual by a greater number of meiosis events. One or more rule-based heuristics may be utilized to determine a relationship directionality on the basis of the difference in degrees of relatedness between the targets. Alternatively, or additionally, a machine-learning approach may be utilized to receive the difference in degrees of relatedness as a feature for predicting the relationship directionality. In embodiments, the degree of relatedness to shared matches may be used as part of, an alternative to, or in parallel with the use of the trained model for disambiguating relationships. It has been found that a surprising degree of agreement is observed between predictions made based on degrees of relatedness with shared matches and predictions made using the trained model, validating the approach of the disclosed embodiments.

In some embodiments, a threshold number of genetic matches may be required or selected for use as features in the trained model for M4 relationship prediction. In embodiments, it has been found that results and performance resources and costs can be optimized by including a top 10 genetic matches, a top 15 genetic matches, a top 20 genetic matches, a top 25 genetic matches, a top 30 genetic matches, or any other suitable number. In certain embodiments, 15 genetic matches is selected as a threshold number for maximizing accuracy while minimizing unnecessary performance resource usage, as a diminishing return in accuracy is observed at ever-greater numbers of matches. In order to provide a top k number of matches, a raw number of matches needed for the target individual may be as shown in Table 6 below. The top k matches may be determined using any suitable metric, such as a cumulative sum of cM shared, a weighted sum of cM shared, or otherwise.

TABLE 6

| Top K Matches | Raw Number of Matches |
| --- | --- |
| 10 | 39 |
| 15 | 49 |
| 20 | 52 |
| 25 | 48 |
| 30 | 45 |

In some embodiments, a post-processing step may include determining whether a model-generated prediction infers that two individuals are of a single generation, i.e. first cousins or half avuncular. If a phasing model outputs predictions for these individuals that indicates that the two individuals are from different generations, then the model-generated prediction may be adjusted based on the phasing model predictions to change the prediction to great-grandparental/great-grandchild or great-avuncular/great-nibling depending on which of the two aforementioned two alternatives received a higher predictive score from the trained model. For example, a phasing model may utilize a match-based approach to phasing, and may indicate, based on a presence of particular matches on one or both "sides" of a genotyping dataset that an individual is a descendant of another individual. For example, if particular matches appear on only one side of a genotyping dataset for one match, but on both sides of a genotyping dataset for another match, it can be inferred that the individual corresponding to the genotyping dataset with particular matches on both sides is a direct descendant. It has been found that the implementation of this post-processing step advantageously improves accuracy from 95.1% to 95.4%.

Figure 10:
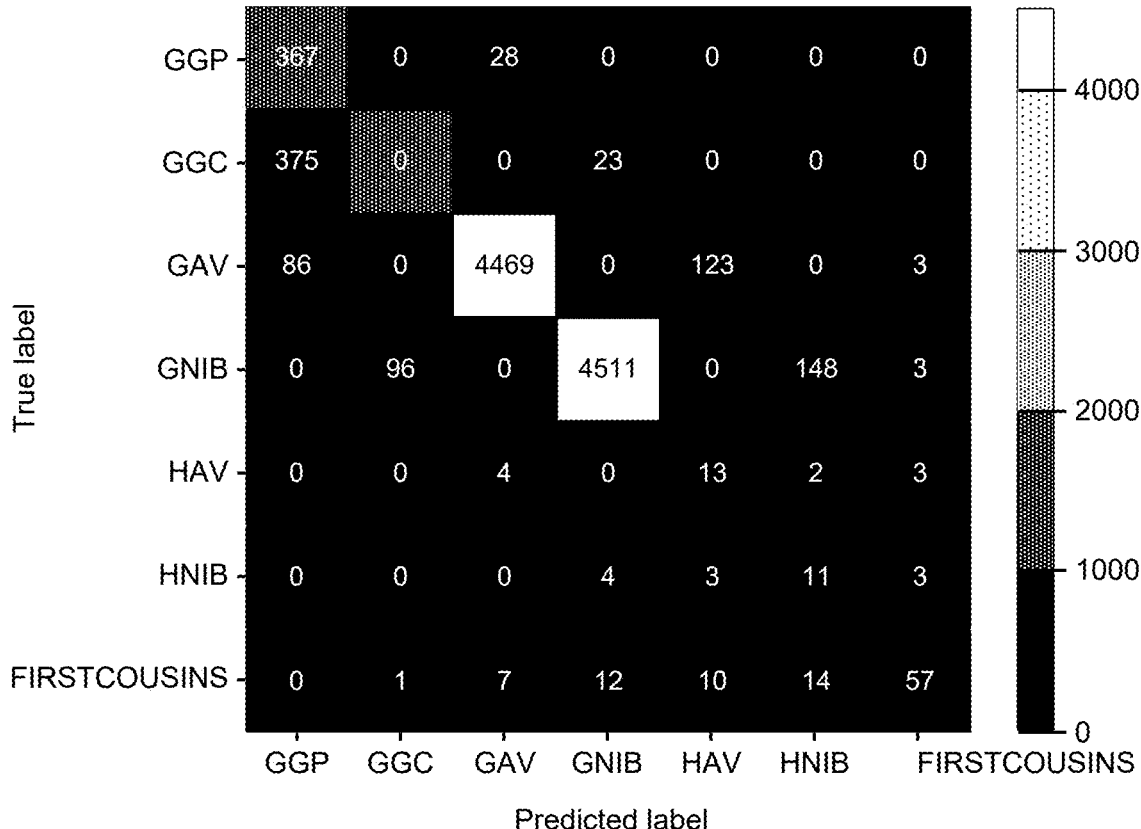
FIG. 10 shows an M4 relationship-prediction confusion matrix, in accordance with an embodiment.

FIG. 10 shows a relationship-prediction confusion matrix demonstrating the accuracy of prediction results using the M4 relationship classification model described herein. As seen, FIG. 10 demonstrates the superior accuracy of the M4 relationship-classification model of disclosed embodiments, with accurate resolution of M4 matches to the appropriate categories across each of the relationship types included in the M4 category. Indeed, the trained model achieves this high accuracy with a no-call rate (in which the relationship cannot be assigned to a particular relationship type with enough confidence to present to a user) of less than 4%, and this when relying only on M4 matches and above. That is, these results may be obtained without having any M1-M3 matches to assist with disambiguating the relationship type, thereby assisting persons who are new among their family to genetic genealogy to bootstrap the genetic and family-history exploration process. It will be appreciated that while models that do not rely on any M1-M3 matches are described, the disclosure is not limited thereto; rather, models that include features from M1-M3 matches as well as M4+ matches may be used as suitable.

ADDITIONAL EMBODIMENTS

Clause 1. A computer-implemented method, comprising: receiving a target individual genetic dataset associated with a target individual; receiving a target relative genetic dataset associated with a target relative who is a target relative of the target individual; identifying a plurality of genetic matches, each genetic match being an individual whose genetic data matches the target individual genetic dataset, the target relative genetic dataset, or both; extracting features from the plurality of genetic matches; and inputting the extracted features into a machine learning model to determine a familial relationship between the target individual and the target relative.

Clause 2. The computer-implemented method of clause 1, wherein identifying the plurality of genetic matches comprises: determining a meiosis-separation relationship between the target individual and the target relative based on a degree of match between the target individual genetic dataset and the target relative genetic dataset; and identifying the plurality of genetic matches based on the determined meiosis-separation relationship such that the plurality of genetic matches each have a meiosis-separation relationship with the target individual or the target relative that is different from the meiosis-separation relationship between the target individual and the target relative.

Clause 3. The computer-implemented method of clause 1, wherein extracting the features from the plurality of genetic matches comprises: determining: a first length of IBD segments shared by the target individual and the each genetic match, a second length of IBD segments shared by the target relative and the each genetic match, and a length difference of IBD segments based on the first length of IBD segments and the second length of IBD segments; determining: a first number of IBD segments shared by the target individual and the each genetic match, a second number of IBD segments shared by the target relative and the each genetic match, and a number difference of IBD segments based on the first number of IBD segments and the second number of IBD segments; determining: a first number of meiosis separations between the target individual and the each genetic match, a second number of meiosis separations between the target relative and the each genetic match, and a number difference of meiosis separations based on the first number of meiosis separations and the second number of meiosis separations; and extracting the features from the length difference of IBD segments, the number difference of IBD segments, and/or the number difference of meiosis separations.

Clause 4. The computer-implemented method of clause 3, wherein the features comprise: a mean, a median, a standard deviation, a maximum and/or a minimum of the length differences of IBD segments; a mean, a median, a standard deviation, a maximum and/or a minimum of the number differences of IBD segments; or a mean, a median, a standard deviation, a maximum and/or a minimum of the number difference of meiosis separations.

Clause 5. The computer-implemented method of clause 1, wherein the machine learning model comprises a regression model, a random forest classifier, a support vector machine, a neural network, or a model trained by an unsupervised approach.

Clause 6. The computer-implemented method of clause 1, further comprising connecting the target relative and the target individual in a family tree based on the determined familial relationship.

Clause 7. The computer-implemented method of clause 1, wherein the familial relationship between the target individual and the target relative comprise any one of: grandparent/grandchild; half siblings; or aunt/niece, uncle/nephew or any combination therein.

Clause 8. A system comprising: one or more processors; and memory configured to store instructions, wherein the instructions, when executed by the one or more processors, cause the one or more processors to perform steps comprising: receiving a target individual genetic dataset associated with a target individual; receiving a target relative genetic dataset associated with a target relative who is a target relative of the target individual; identifying a plurality of genetic matches, each genetic match being an individual whose genetic data matches the target individual genetic dataset, the target relative genetic dataset, or both; extracting features from the plurality of genetic matches; and inputting the extracted features into a machine learning model to determine a familial relationship between the target individual and the target relative.

Clause 9. The system of clause 8, wherein identifying the plurality of genetic matches comprises: determining a meiosis-separation relationship between the target individual and the target relative based on a degree of match between the target individual genetic dataset and the target relative genetic dataset; and identifying the plurality of genetic matches based on the determined meiosis-separation relationship such that the plurality of genetic matches each have a meiosis-separation relationship with the target individual or the target relative that is different from the meiosis-separation relationship between the target individual and the target relative.

Clause 10. The system of clause 8, wherein extracting the features from the plurality of genetic matches comprises: determining: a first length of IBD segments shared by the target individual and said each genetic match, a second length of IBD segments shared by the target relative and said each genetic match, and a length difference of IBD segments based on the first length of IBD segments and the second length of IBD segments; determining: a first number of IBD segments shared by the target individual and said each genetic match, a second number of IBD segments shared by the target relative and said each genetic match, and a number difference of IBD segments based on the first number of IBD segments and the second number of IBD segments; determining: a first number of meiosis separations between the target individual and said each genetic match, a second number of meiosis separations between the target relative and said each genetic match, and a number difference of meiosis separations based on the first number of meiosis separations and the second number of meiosis separations; and extracting the features from the length difference of IBD segments, the number difference of IBD segments, and/or the number difference of meiosis separations.

Clause 11. The system of clause 10, wherein the features comprise: a mean, a median, a standard deviation, a maximum and/or a minimum of the length differences of IBD segments; a mean, a median, a standard deviation, a maximum and/or a minimum of the number differences of IBD segments; and/or a mean, a median, a standard deviation, a maximum and/or a minimum of the number difference of meiosis separations.

Clause 12. The system of clause 8, wherein the machine learning model comprises a regression model, a random forest classifier, a support vector machine, a neural network, or a model trained by an unsupervised approach.

Clause 13. The system of clause 8, further comprising connecting the target relative and the target individual in a family tree based on the determined familial relationship.

Clause 14. The system of clause 8, wherein the familial relationship between the target individual and the target relative comprise any one of: grandparent/grandchild; half siblings; or aunt/niece, uncle/nephew or any combination therein.

Clause 15. A non-transitory computer readable medium for storing computer code comprising instructions, when executed by one or more computer processors, causing one or more computer processors to perform steps comprising: receiving a target individual genetic dataset associated with a target individual; receiving a target relative genetic dataset associated with a target relative who is a target relative of the target individual; identifying a plurality of genetic matches, each genetic match being an individual whose genetic data matches the target individual genetic dataset, the target relative genetic dataset, or both; extracting features from the plurality of genetic matches; and inputting the extracted features into a machine learning model to determine a familial relationship between the target individual and the target relative.

Clause 16. The non-transitory computer readable medium of clause 15, wherein identifying the plurality of genetic matches comprises: determining a meiosis-separation relationship between the target individual and the target relative based on a degree of match between the target individual genetic dataset and the target relative genetic dataset; and identifying the plurality of genetic matches based on the determined meiosis-separation relationship such that the plurality of genetic matches each have a meiosis-separation relationship with the target individual or the target relative that is different from the meiosis-separation relationship between the target individual and the target relative.

Clause 17. The non-transitory computer readable medium of clause 15, wherein extracting the features from the plurality of genetic matches comprises: determining: a first length of IBD segments shared by the target individual and said each genetic match, a second length of IBD segments shared by the target relative and said each genetic match, and a length difference of IBD segments based on the first length of IBD segments and the second length of IBD segments; determining: a first number of IBD segments shared by the target individual and said each genetic match, a second number of IBD segments shared by the target relative and said each genetic match, and a number difference of IBD segments based on the first number of IBD segments and the second number of IBD segments; determining: a first number of meiosis separations between the target individual and said each genetic match, a second number of meiosis separations between the target relative and said each genetic match, and a number difference of meiosis separations based on the first number of meiosis separations and the second number of meiosis separations; and extracting the features from the length difference of IBD segments, the number difference of IBD segments, and/or the number difference of meiosis separations.

Clause 18. The non-transitory computer readable medium of clause 17, wherein the features comprise: a mean, a median, a standard deviation, a maximum and/or a minimum of the length differences of IBD segments; a mean, a median, a standard deviation, a maximum and/or a minimum of the number differences of IBD segments; and/or a mean, a median, a standard deviation, a maximum and/or a minimum of the number difference of meiosis separations.

Clause 19. The non-transitory computer readable medium of clause 15, wherein the machine learning model comprises a regression model, a random forest classifier, a support vector machine, a neural network, or a model trained by an unsupervised approach.

Clause 20. The non-transitory computer readable medium of clause 15, wherein the familial relationship between the target individual and the target relative comprise any one of: grandparent/grandchild; half siblings; or aunt/niece, uncle/nephew or any combination therein.

Computing Machine Architecture

Figure 8:
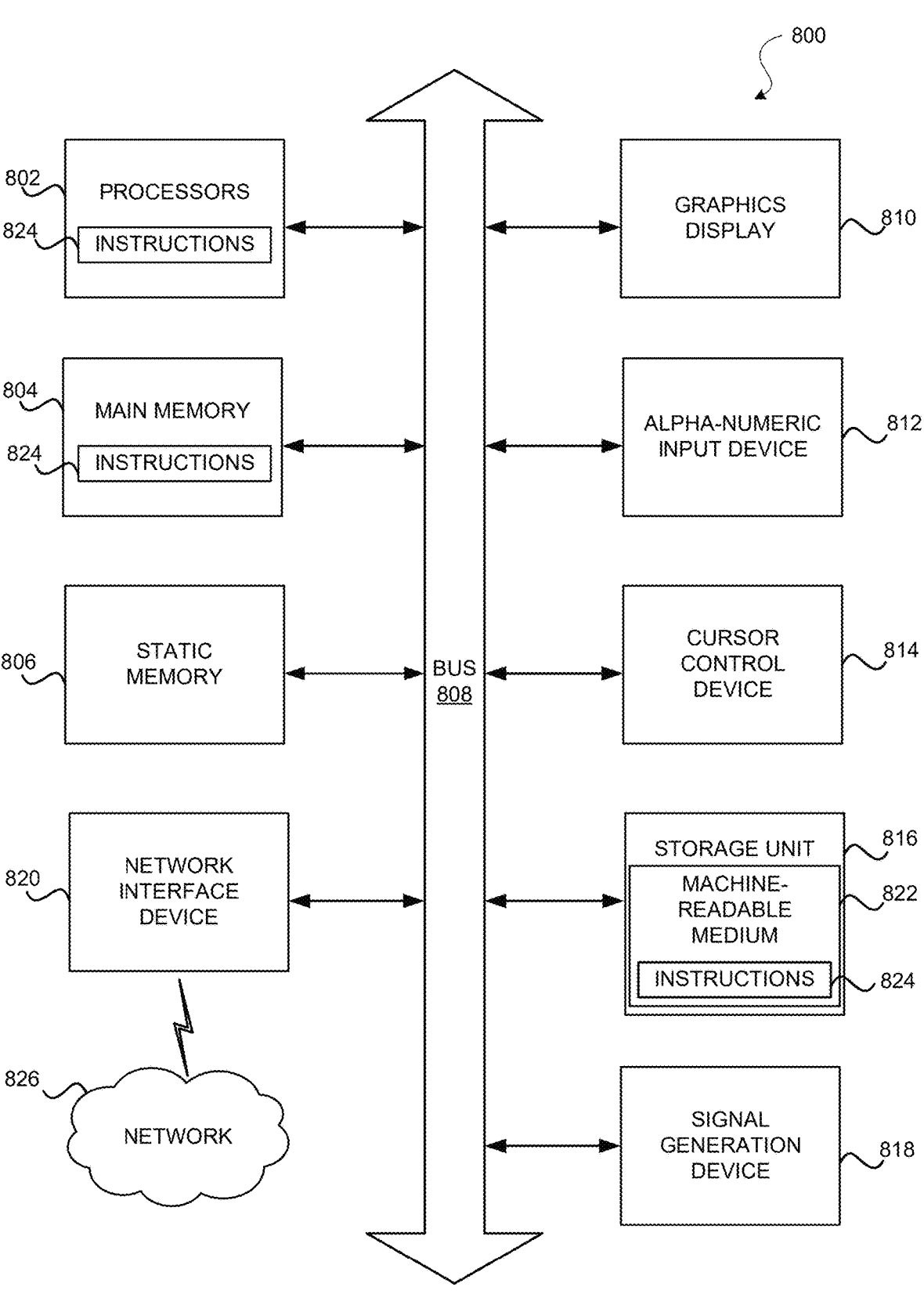
FIG. 8 is a block diagram illustrating example computer architecture, in accordance with an embodiment.

FIG. 8 is a block diagram illustrating components of an example computing machine that is capable of reading instructions from a computer-readable medium and execute them in a processor (or controller). A computer described herein may include a single computing machine shown in FIG. 8, a virtual machine, a distributed computing system that includes multiples nodes of computing machines shown in FIG. 8, or any other suitable arrangements of electronic devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the client device 110, the computing server 130, and various engines, interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" and "computer" may also be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 may also include a memory 804 that store computer code including instructions 824 that may cause the processors 802 to perform certain actions when the instructions are executed, directly or indirectly by the processors 802. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 802 and reduces the space required for the memory 804. For example, the database processing techniques and machine learning methods described herein reduce the complexity of the computation of the processors 802 by applying one or more novel techniques that simplify the steps in training, reaching convergence, and generating results of the processors 802. The algorithms described herein also reduces the size of the models and datasets to reduce the storage space requirement for memory 804.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situations such as in multiple processors of a system in a chip, in Cloud computing, or in distributed computing.

The computer system 800 may include a main memory 804, and a static memory 806, which are configured to communicate with each other via a bus 808. The computer system 800 may further include a graphical display unit 810 (e.g., a plasma display panel (PDP), a liquid crystal display (LCD), a projector, or a cathode ray tube (CRT)). The graphical display unit 810, controlled by the processors 802, displays a graphical user interface (GUI) to display one or more results and data generated by the processes described herein. The computer system 800 may also include alphanumeric input device 812 (e.g., a keyboard), a cursor control device 814 (e.g., a mouse, a trackball, a joystick, a motion sensor, or other pointing instrument), a storage unit 816 (a hard drive, a solid-state drive, a hybrid drive, a memory disk, etc.), a signal generation device 818 (e.g., a speaker), and a network interface device 820, which are also configured to communicate via the bus 808.

The storage unit 816 includes a computer-readable medium 822 that stores instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be considered to include a single medium or multiple medium (e.g., a centralized or distributed database, or associated caches and servers) able to store instructions (e.g., instructions 824). The computer-readable medium may include any medium that is capable of storing instructions (e.g., instructions 824) for execution by the processors (e.g., processors 802) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
receiving a first genetic dataset associated with a target individual;
receiving a second genetic dataset associated with a target relative, wherein the target relative is a potential relative to the target individual;
determining a total length of genetic segments that are matched between the first genetic dataset and the second genetic dataset;
determining that the total length falls within a predetermined range of a degree of separation;
identifying a plurality of genetic matches, each genetic match being an individual having genetic data that matches the first genetic dataset, the second genetic dataset, or both;
extracting features from the genetic data of the plurality of genetic matches; and
inputting the extracted features into a machine learning model to determine a familial relationship between the target individual and the target relative, the machine learning model specifically trained for the predetermined range of the degree of separation.

2. The computer-implemented method of claim 1, wherein identifying the plurality of genetic matches comprises:
determining a data classification link between the target individual and the target relative based on a degree of match between the first genetic dataset and the second genetic dataset; and
identifying the plurality of genetic matches based on the determined data classification link.

3. The computer-implemented method of claim 1, wherein extracting the features from the plurality of genetic matches comprises:
determining:
a first length of matched-data-string segments shared by the target individual and the each genetic match,
a second length of matched-data-string segments shared by the target relative and the each genetic match, and

a length difference of matched-data-string segments based on the first length of matched-data-string segments and the second length of matched- data-string segments;
determining:
a first number of matched-data-string segments shared by the target individual and the each genetic match,
a second number of matched-data-string segments shared by the target relative and the each genetic match, and
a number difference of matched-data-string segments based on the first number of matched-data-string segments and the second number of matched-data-string segments;
determining:
a first number of shared classification-data segments between the target individual and the each genetic match,
a second number of shared classification-data segments between the target relative and the each genetic match, and
a number difference of shared classification-data segments based on the first number of shared classification-data segments and the second number of shared classification-data segments; and
extracting the features from the length difference of matched-data-string segments, the number difference of matched-data-string segments, or the number difference of shared classification-data segments.

4. The computer-implemented method of claim 3, wherein the features comprise:
a mean, a median, a standard deviation, a maximum or a minimum of the length differences of matched-data-string segments;
a mean, a median, a standard deviation, a maximum or a minimum of the number differences of matched-data-string segments; or
a mean, a median, a standard deviation, a maximum or a minimum of the number difference of shared classification-data segments.

5. The computer-implemented method of claim 1, wherein the machine learning model comprises a regression model, a random forest classifier, a support vector machine, a neural network, or a model trained by an unsupervised approach.

6. The computer-implemented method of claim 1, further comprising connecting the target individual and the target relative in a data tree based on the familial relationship.

7. The computer-implemented method of claim 1, wherein the familial relationship between the target individual and the target relative is an M3 relationship.

8. The computer-implemented method of claim 1, further comprising connecting the target individual and the target relative in a data tree based on the familial relationship.

9. A system comprising:
one or more processors; and
memory configured to store instructions, wherein the instructions, when executed by the one or more processors, cause the one or more processors to perform steps comprising:
receiving a first genetic dataset associated with a target individual;
receiving a second genetic dataset associated with a target relative, wherein the target relative is a potential relative to the target individual;

determining a total length of genetic segments that are matched between the first genetic dataset and the second genetic dataset;

determining that the total length falls within a predetermined range of a degree of separation;

identifying a plurality of genetic matches, each genetic match being an individual having genetic data that matches the first genetic dataset, the second genetic dataset, or both;

extracting features from the genetic data of the plurality of genetic matches; and inputting the extracted features into a machine learning model to determine a familial relationship between the target individual and the target relative, the machine learning model specifically trained for the predetermined range of the degree of separation.

10. The system of claim 9, wherein identifying the plurality of genetic matches comprises:

determining a data classification link between the target individual and the target relative based on a degree of match between the first genetic dataset and the second genetic dataset; and identifying the plurality of genetic matches based on the determined data classification link.

11. The system of claim 9, wherein extracting the features from the plurality of genetic matches comprises:

determining:

a first length of matched-data-string segments shared by the target individual and the each genetic match, a second length of matched-data-string segments shared by the target relative and the each genetic match, and a length difference of matched-data-string segments based on the first length of matched-data-string segments and the second length of matched- data-string segments;

determining:

a first number of matched-data-string segments shared by the target individual and the each genetic match, a second number of matched-data-string segments shared by the target relative and the each genetic match, and a number difference of matched-data-string segments based on the first number of matched-data-string segments and the second number of matched-data-string segments;

determining:

a first number of shared classification-data segments between the target individual and the each genetic match, a second number of shared classification-data segments between the target relative and the each genetic match, and a number difference of shared classification-data segments based on the first number of shared classification-data segments and the second number of shared classification-data segments; and extracting the features from the length difference of matched-data-string segments, the number difference of matched-data-string segments, or the number difference of shared classification-data segments.

12. The system of claim 11, wherein the features comprise:

a mean, a median, a standard deviation, a maximum or a minimum of the length differences of matched-data-string segments;

a mean, a median, a standard deviation, a maximum or a minimum of the number differences of matched-data-string segments; or a mean, a median, a standard deviation, a maximum or a minimum of the number difference of shared classification-data segments.

13. The system of claim 9, wherein the machine learning model comprises a regression model, a random forest classifier, a support vector machine, a neural network, or a model trained by an unsupervised approach.

14. The system of claim 9, wherein the familial relationship between the target individual and the target relative is an M3 relationship.

15. A non-transitory computer readable medium for storing computer code comprising instructions, when executed by one or more computer processors, causing one or more computer processors to perform steps comprising:

receiving a first genetic dataset associated with a target individual;

receiving a second genetic dataset associated with a target relative, wherein the target relative is a potential relative to the target individual;

determining a total length of genetic segments that are matched between the first genetic dataset and the second genetic dataset;

determining that the total length falls within a predetermined range of a degree of separation;

identifying a plurality of genetic matches, each genetic match being an individual having genetic data that matches the first genetic dataset, the second genetic dataset, or both;

extracting features from the genetic data of the plurality of genetic matches; and inputting the extracted features into a machine learning model to determine a familial relationship between the target individual and the target relative, the machine learning model specifically trained for the predetermined range of the degree of separation.

16. The non-transitory computer readable medium of claim 15, wherein identifying the plurality of genetic matches comprises:

determining a data classification link between the target individual and the target relative based on a degree of match between the first genetic dataset and the second genetic dataset; and identifying the plurality of genetic matches based on the determined data classification link.

17. The non-transitory computer readable medium of claim 15, wherein extracting the features from the plurality of genetic matches comprises:

determining:

a first length of matched-data-string segments shared by the target individual and the each genetic match, a second length of matched-data-string segments shared by the target relative and the each genetic match, and a length difference of matched-data-string segments based on the first length of matched-data-string segments and the second length of matched- data-string segments;

determining:

a first number of matched-data-string segments shared by the target individual and the each genetic match, a second number of matched-data-string segments shared by the target relative and the each genetic match, and a number difference of matched-data-string segments based on the first number of matched-data-string segments and the second number of matched-data-string segments;

determining:

a first number of shared classification-data segments between the target individual and the each genetic match, a second number of shared classification-data segments between the target relative and the each genetic match, and a number difference of shared classification-data segments based on the first number of shared classification-data segments and the second number of shared classification-data segments; and extracting the features from the length difference of matched-data-string segments, the number difference of matched-data-string segments, or the number difference of shared classification-data segments.

18. The non-transitory computer readable medium of claim 17, wherein the features comprise:

a mean, a median, a standard deviation, a maximum or a minimum of the length differences of matched-data-string segments;

a mean, a median, a standard deviation, a maximum or a minimum of the number differences of matched-data-string segments; or a mean, a median, a standard deviation, a maximum or a minimum of the number difference of shared classification-data segments.

19. The non-transitory computer readable medium of claim 15, wherein the machine learning model comprises a regression model, a random forest classifier, a support vector machine, a neural network, or a model trained by an unsupervised approach.

20. The non-transitory computer readable medium of claim 15, wherein the familial relationship between the target individual and the target relative is an M3 relationship.

* * * * *